(12) United States Patent
Feng et al.

(10) Patent No.: US 11,791,646 B1
(45) Date of Patent: Oct. 17, 2023

(54) CHARGING SYSTEM FOR ELECTRONIC DEVICES

(71) Applicant: Amazon Technologies, Inc., Seattle, WA (US)

(72) Inventors: Ming Feng, Cupertino, CA (US); Benjamin Gaide, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/897,444

(22) Filed: Aug. 29, 2022

Related U.S. Application Data

(63) Continuation of application No. 16/531,740, filed on Aug. 5, 2019, now Pat. No. 11,431,185.

(51) Int. Cl.
*H02J 7/00* (2006.01)
*H04R 1/10* (2006.01)

(52) U.S. Cl.
CPC .............. *H02J 7/0071* (2020.01); *H02J 7/00* (2013.01); *H02J 7/0036* (2013.01); *H02J 7/0042* (2013.01); *H04R 1/1016* (2013.01)

(58) Field of Classification Search
CPC ........................................................ H02J 7/00
See application file for complete search history.

(56) References Cited

U.S. PATENT DOCUMENTS

| 2016/0006292 | A1* | 1/2016 | Hatanaka | H02J 7/0042 |
| | | | | 320/108 |
| 2018/0091887 | A1 | 3/2018 | Minoo et al. | |
| 2018/0183252 | A1 | 6/2018 | Kim et al. | |
| 2019/0173297 | A1* | 6/2019 | Maetani | H02J 7/00304 |

OTHER PUBLICATIONS

Office Action for U.S. Appl. No. 16/531,740, dated Oct. 5, 2021, Feng, "Charging System for Electronic Devices", 8 pages.

\* cited by examiner

*Primary Examiner* — Robert Grant
(74) *Attorney, Agent, or Firm* — Lee & Hayes, P.C.

(57) ABSTRACT

A device including a first receptacle for receiving a first electronic device, a second receptacle for receiving a second electronic device, a first switching charger for fast charging the first electronic device, and a second switching charger for fast charging the second electronic device. The device may determine that the first electronic device is communicatively coupled to the device within the first receptacle and that the second electronic device is communicatively coupled to the device within the second receptacle. The device may receive a first request from the first electronic device to fast charge the first electronic device via the first switching charger and charge the first electronic device via the first switching charger. Additionally, the device may receive a second request from the second electronic device to fast charge the second electronic device via the second switching charger and charge the second electronic device via the second switching charger.

20 Claims, 9 Drawing Sheets

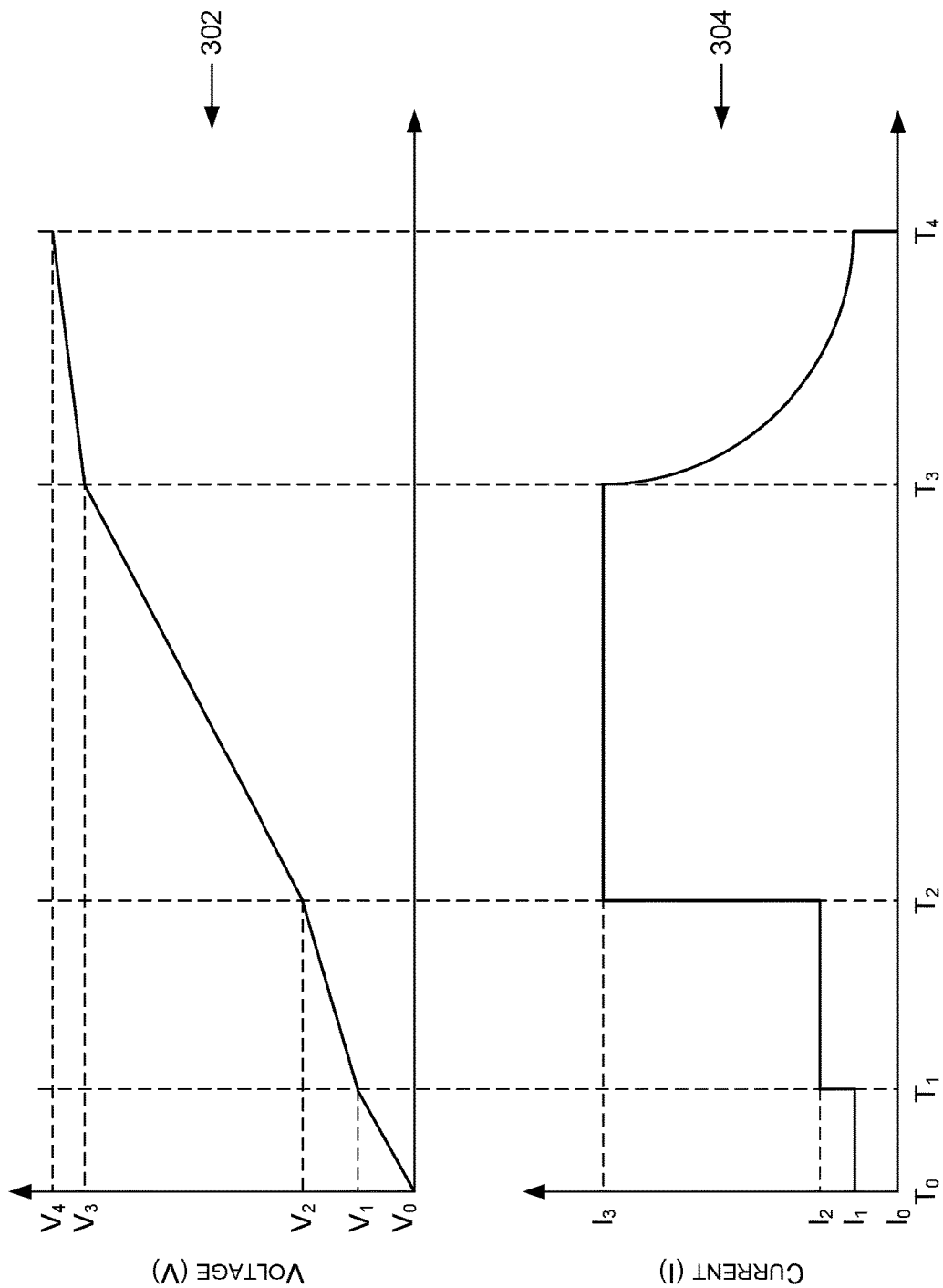

CHARGING SYSTEM FOR ELECTRONIC DEVICES

CROSS-REFERENCE TO RELATED APPLICATIONS

This patent application is a continuation of and claims priority to U.S. patent application Ser. No. 16/531,740, filed Aug. 5, 2019, which is fully incorporated herein by reference.

BACKGROUND

Wireless electronic devices may receive power via a battery. In such instances, the electronic devices may connect to an external power source for recharging the battery. Existing electronic devices, however, often have limited charging speeds due to size constrains. Moreover, with increasing power demands of electronic devices, limited charging speeds may no longer fulfill charging requirements. However, charging electronic devices at increased speeds may lead to overheating, which may damage the electronic devices and/or pose safety concerns. Accordingly, conventional topologies are inefficient, require electronic devices to be inoperable for extended periods of time, and fail to fulfill charge requirements.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 illustrates an example profile showing example stages to charge the wireless headphones, according to an embodiment of the present disclosure.

DETAILED DESCRIPTION

Figure 1:
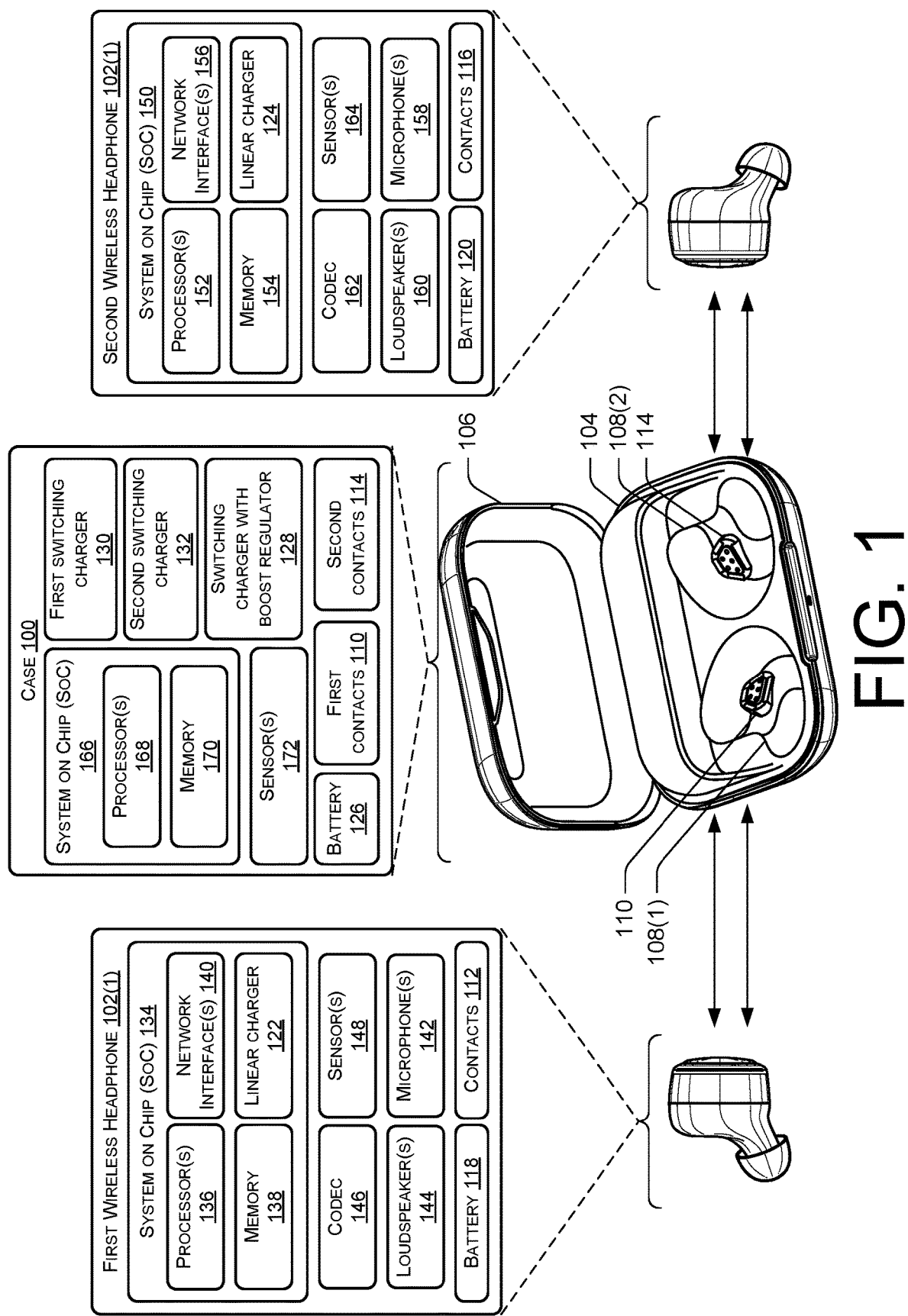
FIG. 1 illustrates an example case for charging electronic devices, such as wireless headphones, according to an embodiment of the present disclosure.

The present application describes, in part, a charger that efficiently and conveniently charges electronic devices. In some instances, the charger may include a case having receptacle(s) that receive the electronic device(s). The case, such as the receptacles, may include contacts (e.g., pins, pads, prongs, etc.) that engage with corresponding contacts (e.g., pins, pads, prongs, etc.) of the electronic device(s) for charging (e.g., electrical charge) a battery (or batteries) of the electronic device(s). The contacts, respectively, in some instances, may permit communication between the case the electronic device(s). In some instances, the charger may charge the electronic device(s) via a battery disposed within the case. Additionally, or alternatively, the charger may receive mains power for charging the electronic device(s) (e.g., alternating current (AC)). The case and/or the electronic device(s) may include charging circuitry and/or electrical components that transfer and receive power for charging the electronic device(s). Additionally, the charger (or case) may include components to charge one or more electronic device(s) (e.g., two, three, four, etc.) and/or different types of electronic device(s).

In some instances, the electronic device(s) may be charged by at varying rates, speeds, modes, currents, or stages based at least in part on a level, charge, capacity, or life of the battery. For example, the electronic device(s) and the charger may communicatively couple to transmit and receive indications associated with charging and the indications may be utilized to charge the electronic device(s) at particular speeds. For example, upon connecting to the charger, the electronic device(s) may determine the battery life. In instances where the battery life or battery percentage is below a first voltage threshold or first battery percentage, low dropout (LDO) chargers or linear chargers may charge the electronic device(s). In some instances, linearly charging may involve charging the electronic device(s) at a constant rate (e.g., voltage and/or current) until the first voltage threshold or the first battery percentage to safely condition or pre-charge the battery of the electronic device(s).

Once above the first voltage threshold or first battery percentage, the electronic device(s) may be fast charged via high-efficiency switching chargers. In some instances, the case and/or the electronic device(s) may configure for fast charging and/or handling increased voltages. For example, charging circuitry within the charger and/or the electronic device(s) may enable and/or disable field effect transistor(s) (FETs). In some instances, the charger and/or the electronic device may include logic (e.g., processor(s), memory, system on chip, system on a chip, etc.) for controlling the charging circuitry (e.g., switches), enabling and disabling components of the charging circuitry, and/or turning on or off components of the charging circuitry. For example, configuring the electronic device(s) for fast charging may involve disabling charging via the linear chargers and enabling the switching charger/switching circuit. Additionally, or alternatively, FET(s) within the charger and/or the electronic device(s) may be disabled and/or enabled for routing power from the charger to the battery of the electronic device(s), respectively. In this sense, the FET(s) may act as a switch circuit to permit charging via the linear charger and the switching charger/switching circuit.

In some instances, fast charging may continue until a second voltage threshold or a second battery percentage. Upon reaching the second threshold level or second battery percentage, the electronic device(s) may be charged via the linear charger. Here, the charger and/or the electronic device(s) may configure for charging via the linear charger. For example, the charger and/or the electronic device(s) may disable the fast charging circuitry and enable the linear charger circuitry. Thereafter, the linear charger may charge the electronic device(s) until fully charged, or until the battery of the electronic device(s) reaches a third voltage threshold or third battery percentage. Utilizing the linear charger to charge the electronic device(s) between the second battery percentage and third battery percentage may permit the electronic device(s) to regulate the current supplied to the battery of the electronic device(s). For example, the linear charger may determine an amount of current supplied to the battery and when the current becomes sufficiently small, or below a predetermined amount, the linear charger may stop (e.g., cease) charging the battery. In other words, the electronic device(s) may determine the current being supplied to the battery and based on determining that the amount of current supplied to the battery is below the predetermined amount, the electronic device(s) may determine that the battery is sufficiently charged and disable charging.

Accordingly, the electronic device(s) may switch between being charged via the linear charger, or a linear charging mode, and the switching charger/switching circuit, or a fast charging mode depending on the battery or stage of charge of the electronic device(s). In some instances, switching between charging the electronic device(s) via the linear charger and the switching charger/switching circuit may increase a charging efficiency. For example, linear chargers are often inefficient as they dissipate input power to reduce an output voltage supplied to the electronic device(s). In some instance, the linear charger may receive and regulate the voltage supplied to the battery of the electronic device(s). Such regulation, however, dissipates power and represents an efficiency loss. For example, the linear charger may receive an input of 5V and output 4.35V. In such instances, as the efficiency of the linear charger is determined by dividing the output voltage by the input voltage, the greater the reduction in voltage across the linear charger equates to an efficiency loss. Moreover, due to possible size constraints of some electronic device(s), linear chargers may be limited to supplying certain voltages or currents. Such limitation may prevent charging at higher speeds. For example, linear chargers designed to charge at increased rates sacrifice a compact form factor in order to accommodate the power dissipation. For some electronic device(s), increasing the size of the electronic device may be undesirable. Moreover, the amount current supplied to the linear chargers may increase the power dissipated by the linear charger To increase charging efficiency, the size of the electronic device(s), and/or to decrease the amount of time to recharge the electronic device(s), the embodiments discussed herein may utilize switching chargers/switching circuits for fast charging (i.e., at higher currents). Moreover, use of switching circuit may enable use of higher voltage/current for charging while reducing the amount of power dissipated thus increasing a charging efficiency. That is, as switching chargers/switching circuits are designed to output higher voltages or currents, as compared to linear chargers, the switching chargers/switching circuits may charge the electronic device(s) with reduced dissipation and at increased rates.

In some instances, the electronic device(s) may include the linear charger and the charger (or the case) may include the switching charger/switching circuit. Moreover, in some instances, the charger may include a switching charger/switching circuit with boost regulator for boosting the voltage for charging the electronic device(s). As fast charging leads to an increase in the amount of heat generated, and as switching chargers/switching circuits are often larger in size than linear charger, the charger may house such components to reduce a size of the electronic device(s) and/or more effectively dissipate heat generated by the switching charger. In other words, as the charger may be larger than the electronic device(s) and/or have less size constraints, the charger may include a greater surface area for dispersing heat generated by fast charging. More efficiently dispersing heat may lead to an increase in battery performance, life, a longevity of the charging circuitry within the case and/or the electronic device(s), and/or charging efficiency, which may reduce a size of the case, the electronic device(s), and/or the batteries of the case and/or electronic device(s), respectively. In other words, compared to conventional techniques and/or designs that may place switching chargers/switching circuits within the electronic device, the embodiments discussed herein may reduce thermal stress within the electronic device(s). As such, including the switching chargers/switching circuits within charger permits the electronic device(s) to be charged at increased currents due to the thermal relief provided the case, which in turn, may reduce a charging time of the electronic device(s). Thus, in light of the above, the linear charger and the switching charger/switching circuit may be utilized to safely, efficiently, and effectively charge, or recharge, the electronic device(s) within minimal periods of time to maximize a time the electronic device(s) are available for use. In some instances, the techniques discussed herein may have a charging efficiency of about, or substantially 90 percent, which in some instances, may permit a reduction in battery size and/or less extreme temperatures within the electronic device(s).

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example charger, or case 100, for charging one or more electronic devices, such as a first wireless headphone 102(1) and a second wireless headphone 102(2) (hereinafter, collectively "the wireless headphones 102"). In some instances, the wireless headphones 102 may resemble in-ear, over-ear, on-ear, and/or other forms of wireless headphones. In some instances, one or more of the wireless headphones 102 may be in communication with an electronic device, such as a mobile device (e.g., phone, tablet, laptop, etc.), and the wireless headphones may include multiple (e.g., two, three, etc.) wireless headphones that are synched, paired, or otherwise in communication with one another. In the examples described below, the techniques are discussed with reference to a pair of wireless headphones. However, although FIG. 1 and the discussion herein relates to the use of the case 100 for charging the wireless headphones 102, the techniques herein may extend to other electronic devices. For example, the techniques discussed herein may be utilized to charge electronic devices including but not limited phones, laptops, tablets, loudspeakers, cameras, voice-recorders, video-recorders, hearing aids, gaming consoles, pagers, power tools, and/or other devices, equipment, or rechargeable instruments capable of and/or needing recharge.

In some instances, the case 100 may provide an enclosure in which the wireless headphones 102 reside. For example, the case 100 may include a bottom 104 and a top 106 that operably engage to provide an area for occupying the wireless headphones 102. In some instances, the top 106 may pivotably couple to the bottom 104 and the case 100 may transition between a closed state and an open state. In the closed state, the bottom 104 and the top 106 may provide the enclosure for the wireless headphones 102 and/or may secure the wireless headphones 102 within the case 100 (e.g., for transport). In the open state, for example, as shown in FIG. 1, the case 100 may receive the wireless headphones 102 and/or the wireless headphones 102 may be removed from the case 100. FIG. 1 illustrates the wireless headphones 102 disposed outside the case 100 to illustrate features of the case 100.

The case 100 may include ports, holders, apertures, or receptacles for receiving the wireless headphones 102, or in which the wireless headphones 102 reside when placed within the case 100. In some instances, the case 100 may include a corresponding number of receptacles as a number of the wireless headphones 102 (or other electronic device(s)). For example, as shown in FIG. 1, the case 100 may include a first receptacle 108(1) for receiving the first wireless headphone 102(1) and a second receptacle 108(2) for receiving the second wireless headphone 102(2) (hereinafter, collectively "the receptacles 108"). Additionally, in some instances, the receptacles 108 may include features or shapes that position or orient the wireless headphones 102 within the case 100 for storage and/or charging.

The case 100 may include contacts that engage with the wireless headphones 102, respectively. For example, the case 100 may include first contacts 110 within the first receptacle 108(1) and second contacts 114 within the second receptacle 108(2). The first contacts 110 engage with corresponding contacts 112 of the first wireless headphone 102(1) for communicatively coupling and charging the first wireless headphone 102(1). Similarly, the second contacts 114 engage with corresponding contacts 116 of the second wireless headphone 102(2) for communicatively coupling and charging the second wireless headphone 102(2).

In some instances, the first contacts 110, the second contacts 114, the contacts 112 of the first wireless headphones 102(1), and/or the contacts 116 of the second wireless headphone 102(2), may include five contacts. In some instances, a first contact may correspond to a transmitter contact through which the case 100, the first wireless headphone 102(1), and/or the second wireless headphone 102(2) transmit data, indications, or other instructions. A second contact may correspond to a receiver contact through which the case 100, the first wireless headphone 102(1), and/or the second wireless headphone 102(2) receive data, indications, or other instructions. A third contact may correspond to a power contact through which the case 100 transmits and the first wireless headphone 102(1) and the second wireless headphone 102(2) receive power, respectively. In some instances, the case 100, the first wireless headphone 102(1), and/or the second wireless headphone 102(2) may respectively utilize different contacts for linearly charging and fast charging, or may utilize the same contacts for linearly charging and fast charging. A fourth contact may correspond to a ground contact and a fifth contact may correspond to an indicator contact for determining when (or if) the first wireless headphone 102(1) and the second wireless headphone 102(2) are connected to the case 100, respectively (e.g., placed within the first receptacle 108(1) and the second receptacle 108(2), respectively). In other words, the fifth contact may be utilized for determining that the wireless headphones 102 are coupled to the case 100 to initiate charging.

After being placed in the case 100, power may be transferred to the first wireless headphone 102(1) and the second wireless headphone 102(2). Discussed above, in some instances, the first wireless headphone 102(1), the second wireless headphone 102(2), and/or the case 100 may utilize the first contacts 110 and the second contacts 114, respectively, for determining that the first wireless headphone 102(1) and/or the second wireless headphone 102(2) are coupled to the case 100. In some instances, initially, the first wireless headphone 102(1) and/or the second wireless headphone 102(2) may transmit indications of their respective battery levels or battery percentages, via the first contacts 110 and the second contacts 114, respectively. For example, the first wireless headphone 102(1) may determine a voltage of a battery 118 (e.g., Lithium Ion, etc.) of the first wireless headphone 102(1) and the second wireless headphone 102(2) may determine a voltage of a battery 120 (e.g., Lithium Ion, etc.) of the second wireless headphone 102(2). Based at least in part on the amount of voltage within the battery 118 and the battery 120, the first wireless headphone 102(1) and the second wireless headphone 102(2) may be charged at certain rates or speeds.

For example, FIG. 1 illustrates that the first wireless headphone 102(1) and the second wireless headphone 102(2) include a linear charger 122 (or LDO charger, etc.) and a linear charger 124 (or LDO charger, etc.), respectively. As used herein, a linear charger, such as the linear charger 122 and the linear charger 124, may regulate an output using a linear component, such as a resistive load. The voltage regulator in the linear charger acts as a variable resistor and allows the output resistance value to change to match output power requirements. As the voltage regulator constantly resists current to maintain a voltage, the voltage regulator also acts as a power dissipating device.

Introduced above, the case 100 may transfer power to the first wireless headphone 102(1) via the first contacts 110 and the second wireless headphone 102(2) via the second contacts 114 for enabling the linear charger 122 and the linear charger 124 to charge the battery 118 and the battery 120, respectively. In some instances, the case 100 may supply power (e.g., current) to the first wireless headphone 102(1) and the second wireless headphone 102(2) via a battery 126 of the case 100. The case 100 may therefore utilize the battery 126 for charging the battery 118 and the battery 120, respectively. Additionally, or alternatively, the case 100 may receive mains power from an outlet, or other source (e.g., external battery), and may transfer power to the battery 118 and/or the battery 120. For example, in some instances, the linear charger 122 and the linear charger 124 may dissipate power received from the case 100 to regulate (e.g., reduce) a voltage supplied to the battery 118 and the battery 120, respectively. In some instances, if the battery 118 and/or the battery 120 is/are below a first voltage threshold or battery life, the battery 118 and/or the battery 120 may be charged via the linear charger 122 and the linear charger 124, respectively.

In some instances, the case 100 may include a switching charger with boost regulator 128 for increasing an output voltage of the battery 126 and before supplying power to the wireless headphones 102, respectively. For example, the battery 126 of the case 100 may have a voltage that is below a voltage at which the case 100 is to supply the wireless headphones 102. The switching charger with boost regulator 128 may therefore boost, or increase, the voltage of the battery 126 before the case 100 supplies power to the wireless headphones 102. In some instances, the case 100 may have a buck charger for reducing the voltage in instances where the voltage of the battery 126 is greater than the battery 118 and/or the battery 120

In some instances, charging the first wireless headphone 102(1) and/or the second wireless headphone 102(2) via the linear charger 122 and the linear charger 124, respectively, may continue until the voltage of the battery 118 and the voltage of the battery 120 reaches a second voltage threshold that is greater than the first voltage threshold. Therein, the first wireless headphone 102(1) and/or the second wireless headphone 102(2) may transmit an instruction (or request, indication, etc.) to the case 100 to fast charge the battery 118 and/or the battery 120. In some instances, fast charging the battery 118 and/or the battery 120 may involve utilizing a first switching charger 130 (or first switch charging circuitry), such as a buck-switching charger, buck inverter, switching regulator, etc., and a second switching charger 132 (or second switch charging circuitry) such as a buck-switching charger, buck inverter, switching regulator, etc. within the case 100, respectively. For instance, in response to receiving the instruction from first wireless headphone 102(1) and/or the second wireless headphone 102(2), the case 100 may cause or enable the first switching charger 130 and the second switching charger 132 to charge the first wireless headphone 102(1) and the second wireless headphone 102(2). In other words, the first switching charger 130 may directly charge the battery 118 and the second switching charger 132 may directly charge the battery 120. In such instances, the first wireless headphone 102(1) and the second wireless headphone 102(2) may disable, or prevent, the linear charger 122 and the linear charger 124 from charging the battery 118 and the battery 120, respectively.

As used herein, a switching charger, such as the first switching charger 130 and the second switching charger 132 may regulate an output with pulse width modulation (PWM). PWM may regulate the output of the switching charger by adjusting the pulse width of the high-frequency waveform. Such regulation may operate using a feedback circuit that monitors the voltage and controls the on-off ratio of the PWM.

In some instances, and as will be discussed in greater detail in FIGS. 2A-2C, disabling charging via the linear charger 122 and the linear charger 124, and enabling charging via the first switching charger 130 and the second switching charger 132, vice versa, may involve configuring charging circuitry of the case 100, the first wireless headphone 102(1), and/or the second wireless headphone 102(2). For example, the case 100, the first wireless headphone 102(1), and/or the second wireless headphone 102(2) may include FETs that permit fast charging via the first switching charger 130 and/or the second switching charger 132. Similarly, the FETs of the case 100, the first wireless headphone 102(1), and/or the second wireless headphone 102(2) may permit linearly charging via the linear charger 122 and the linear charger 124. In some instances, the case 100, the first wireless headphone 102(1), and/or the second wireless headphone 102(2) may respectively control, turn on and off, or disable and enable the FETs to switch between linear charging and fast charging. The first switching charger 130 and/or the second switching charger 132 may act as regulators to regulate an amount or level of current supplied or delivered to the first wireless headphone 102(1) and the second wireless headphone 102(2), respectively.

In some instances, fast charging the first wireless headphone 102(1) and/or the second wireless headphone 102(2) may continue until the voltage of the battery 118 and the battery 120, respectively, reach a third voltage threshold. At the third voltage threshold, the first wireless headphone 102(1) and the second wireless headphone 102(2) may respectively transmit an indication to the case 100 to disable fast charging via the first switching charger 130 and the second switching charger 132. Such indication, or request, may cause the case 100 to supply power to the first wireless headphone 102(1) and/or the second wireless headphone 102(2) at decreased voltages or currents. For example, the case 100 and/or the wireless headphones 102 may respectively enable or disable FETs such that power may route through the linear charger 122 and the linear charger 124 for charging the first wireless headphone 102(1) and the second wireless headphone 102(2), respectively. Charging the wireless headphones 102 via the linear charger 122 and the linear charger 124, respectively, may continue until the battery 118 and the battery 120 reach a fourth voltage threshold, or until fully charged. For example, the linear charger 122 and the linear charger 124 may determine an amount of current supplied to the battery 118 and the battery 120, respectively, and when the current becomes sufficiently small, or below a predetermined amount, charging may stop (e.g., cease).

In some instances, the case 100 may charge the first wireless headphone 102(1) and the second wireless headphone 102(2), simultaneously, and/or at different or similar rates depending on the respective battery levels or percentages. Accordingly, depending on the battery level of the battery 118 and the battery 120, respectively, the charging rate or charging mode may be tailored. As an example, the wireless headphones 102 may have different voltages given their respective computing demands and processes. As such, both wireless headphones 102 may be charged simultaneously via fast charging, linear charging, or the first wireless headphone 102(1) may be charged via the linear charger 122 while the second wireless headphone 102(2) may be charged via the second switching charger 132, for example. Moreover, the case 100 may charge the first wireless headphone 102(1) and/or the second wireless headphone 102(2) independently.

In some instances, and as shown in FIG. 1, the linear charger 122 and the linear charger 124 may reside within the first wireless headphone 102(1) and the second wireless headphone 102(2), respectively, while the switching charger with boost regulator 128, the first switching charger 130, the second switching charger 132 may reside in the case 100. Including the switching charger with boost regulator 128, the first switching charger 130, and/or the second switching charger 132 within the case 100, as compared to residing within the wireless headphones 102, may reduce a size of the wireless headphones 102. Additionally, as the switching charger with boost regulator 128, the first switching charger 130, and/or the second switching charger 132 may generate greater amounts of heat (as compared to the linear charger 122 and/or the linear charger 124), the case 100 may more effectively disperse heat than the wireless headphones 102. For example, as the case 100 may not be limited to as strict of form factors or a size as the wireless headphones 102, the case 100 may include a greater surface area for dispersing heat generated by fast charging. Effectively, or more efficiently, dispersing heat generated from fast charging may lead to an increase in charging speed, efficiency, and/or increase a longevity of components within the case 100 and/or the wireless headphones 102.

As illustrated in FIG. 1, the first wireless headphone 102(1) may include a system on chip (SoC) 134 having processor(s) 136, memory 138, and/or network interfaces 140. The first wireless headphone 102(1) is further shown including the linear charger 122, microphone(s) 142, loudspeaker(s) 144, a codec 146, and/or sensor(s) 148. The SoC 134 may carry out operations performable by the first wireless headphone 102(1), such as configuring for fast charging via the first switching charger 130 and/or linear charging via the linear charger 122. For example, the SoC 134 may communicate with charging circuitry of the first wireless headphone 102(1) to disable and/or enable FET(s) depending on the charging mode. Additionally, the SoC 134 may measure a voltage output by the linear charger 122 and/or a current being consumed by or delivered to the battery 118.

In some instances, the first wireless headphone 102(1) may include several network interface(s) 140 to communicatively couple to the second wireless headphone 102(2) and/or other computing devices (e.g., mobile device, server computer, laptop, etc.). For instance, the network interface(s) 140 may include a Bluetooth interface, a Bluetooth Low Energy (BLE) interface, and/or a near field magnetic induction (NFMI) interface. In some instances, the first wireless headphone 102(1) may communicatively couple to a mobile device using the Bluetooth interface, via a first communication channel, may communicatively couple to the second wireless headphone 102(2) using the NFMI interface via a second communication channel, and/or may communicatively couple to the second wireless headphone 102(2) using the BLE interface via a third communication channel. In some instances, the first wireless headphone 102(1) may receive setting(s) and/or audio data from the mobile device via the first communication channel. In some instances, the second communication channel between the wireless headphones 102 may be utilized for sending control data between the wireless headphones 102 (e.g., pause, increase volume, playback, etc.), while the third communication channel may be utilized for transmitting audio data (e.g., music, podcasts, phone calls, etc.).

In some instances, as the first wireless headphone 102(1) is connected to the mobile device, the first wireless headphone 102(1) may be designated as a primary headphone that performs voice processing, wake word detection, decoding audio data received from the mobile device, and/or managing a voice call. The second wireless headphone 102(2) connected to the first wireless headphone 102(1) (e.g., primary headphone) via NFMI and BLE may be designated as a secondary headphone and may playback audio received from the primary headphone.

The microphone(s) 142 may detect input from a user, such as user speech. For instance, the microphone(s) 142 may receive audio input, such as sound uttered by the user, and the codec 146 couples to the microphone(s) 142 to encode the audio signals. The codec 146 may also convert audio data between analog and digital formats. For instance, the user may interact with the first wireless headphone 102(1) by speaking and the microphone(s) 142 may capture the user speech. Therein, the codec 146 encodes the user speech and transfers the audio data to other components. The codec 146 is also coupled to the loudspeaker(s) 144 to decode the audio signals for output on the loudspeaker(s) 144. The battery 118 is further provided to distribute power to the various components of the first wireless headphone 102(1). Additionally, the first wireless headphone 102(1) includes the contacts 112 for communicating and/or receiving power from the case 100.

The sensor(s) 148 may include accelerometers, capacitive touch sensors, buttons, motion sensors, and so forth. In some instances, the sensor(s) 148 are capable of receiving and/or detecting input from the user. For example, to increase the volume of the audio output by the loudspeaker(s) 144, the user may tap (e.g., touch) the first wireless headphone 102(1). The sensor(s) 148 may detect this touch, whether by an accelerometer or by capacitive touch sensor, and the processor(s) 136 may determine a command associated with the touch (e.g., increasing the volume). Additionally, the sensor(s) 148 may include a temperature sensor or thermometer to monitor the temperature of the battery 118 during charging. In some instances, the temperature may be used to manage the amount of current being delivered to the battery 118, which may optimize the charge speed of the battery 118 and/or prevent damage to the battery 118.

The second wireless headphone 102(2) may include similar components as the first wireless headphone 102(1), such as a SoC 150 having processor(s) 152, memory 154, and/or network interface(s) 156. The second wireless headphone 102(2) may further include the linear charger 124, microphone(s) 158, loudspeaker(s) 160, a codec 162, and/or sensor(s) 164. In some instances, the second wireless headphone 102(2) may perform similar functions as the first wireless headphone 102(1), such as configuring the second wireless headphone 102(2) for linearly charging, fast charging, detecting user speech, and/or communicatively coupling to the first wireless headphone 102(1) and/or other computing devices. In some instances, the network interface(s) 156 may include a Bluetooth interface, a BLE interface, and a NFMI interface. The second wireless headphone 102(2) includes the battery 120 and the contacts 116 for communicating with and/or receiving power from the case 100.

The case 100 may include a SoC 166 having processor(s) 168 and memory 170. The case 100 also includes the switching charger with boost regulator 128, the first switching charger 130, and the second switching charger 132. The SoC 166 may carry out operations performable by the case 100, such as configuring for fast charging the first switching charger 130 and/or the second switching charger 132. For example, the SoC 166 may communicate with charging circuitry of the case 100 to disable and/or enable FETs depending on the charging mode. Additionally, the SoC 166 may measure a voltage output by the switching charger with boost regulator 128, the first switching charger 130, and/or the second switching charger 132, as well as a current being consumed, or delivered to the battery 118 and/or the battery 120.

The case 100 may further include sensor(s) 172 or other detectors for determining when the wireless headphones 102 are coupled to the case 100, such as the first contacts 110 and the second contacts 114. To permit recharging of the battery 126, the case 100 may additionally, in some instances, include port (e.g., USB, micro-USB) for receiving power from a source (e.g., mains power, external battery, etc.). In some instances, the SoC 166 may include the switching charger with boost regulator 128, first switching charger 130, the second switching charger 132, and/or the sensor(s) 172.

Although the SoC 134, the SoC 150, and the SoC 166 are illustrated as having certain components thereon, the SoC 134, the SoC 150, and the SoC 166 may include additional or alternate components than shown. For example, the SoC 134 may include the codec 146, the microphone(s) 142, and/or the loudspeaker(s) 144. Additionally, or alternatively, in some instances, the SoC 166 may include the first linear charger 130 and the second linear charger 132.

As used herein, a processor, such as the processor(s) 136, 152, and/or 168 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

As used herein, memory, such as the memory 138, 154, and/or 170 may include volatile and nonvolatile memory, removable and non-removable media implemented in any method or technology for storage of information, such as computer-readable instructions, data structures, program component, or other data. The memory described herein is an example of non-transitory computer-readable media and may take the form of volatile memory, such as random access memory (RAM) and/or non-volatile memory, such as read only memory (ROM) or flash RAM. Non-transitory computer-readable media includes volatile and non-volatile, removable and non-removable media implemented in any method or technology for storage of information such as computer-readable instructions, data structures, program modules, or other data for execution by one or more processors of a computing device. Examples of non-transitory computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device and/or the processor(s). As defined herein, computer-readable media does not include transitory media, such as modulated data signals and carrier waves.

As noted above, the first wireless headphone 102(1), the second wireless headphone 102(2), and/or the case 100 may include memory. When present, the memory may store one or more software components, modules, or instructions that, when executed by the processors, configure the wireless headphones 102, respectively, and the case 100 to perform various operations. For instance, the wireless headphones 102 may be configured to capture and respond to user speech and to carry out speech processing, such as automatic speech recognition (ASR) or natural language understanding (NLU). Additionally, the memory may store components for determining the battery life of the battery 118 and the battery 120, respectively, and/or when the wireless headphones 102 are coupled to the case 100. By way of other examples, in some instances, the wireless headphones 102 and/or the case 100 may include a plurality of modules to implement various operations. However, the memory may also include one or more other modules configured to perform a variety of other operations. Additionally, while the memory is described as including software functionality configured as one or more applications or "modules," the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). For example, the wireless headphones 102 may additionally or alternatively include one or more hardware components (e.g., application specific integrated circuits, field programmable gate arrays, systems on a chip, and the like) to implement some or all of the functionalities the modules are described as performing.

Figure 2A:
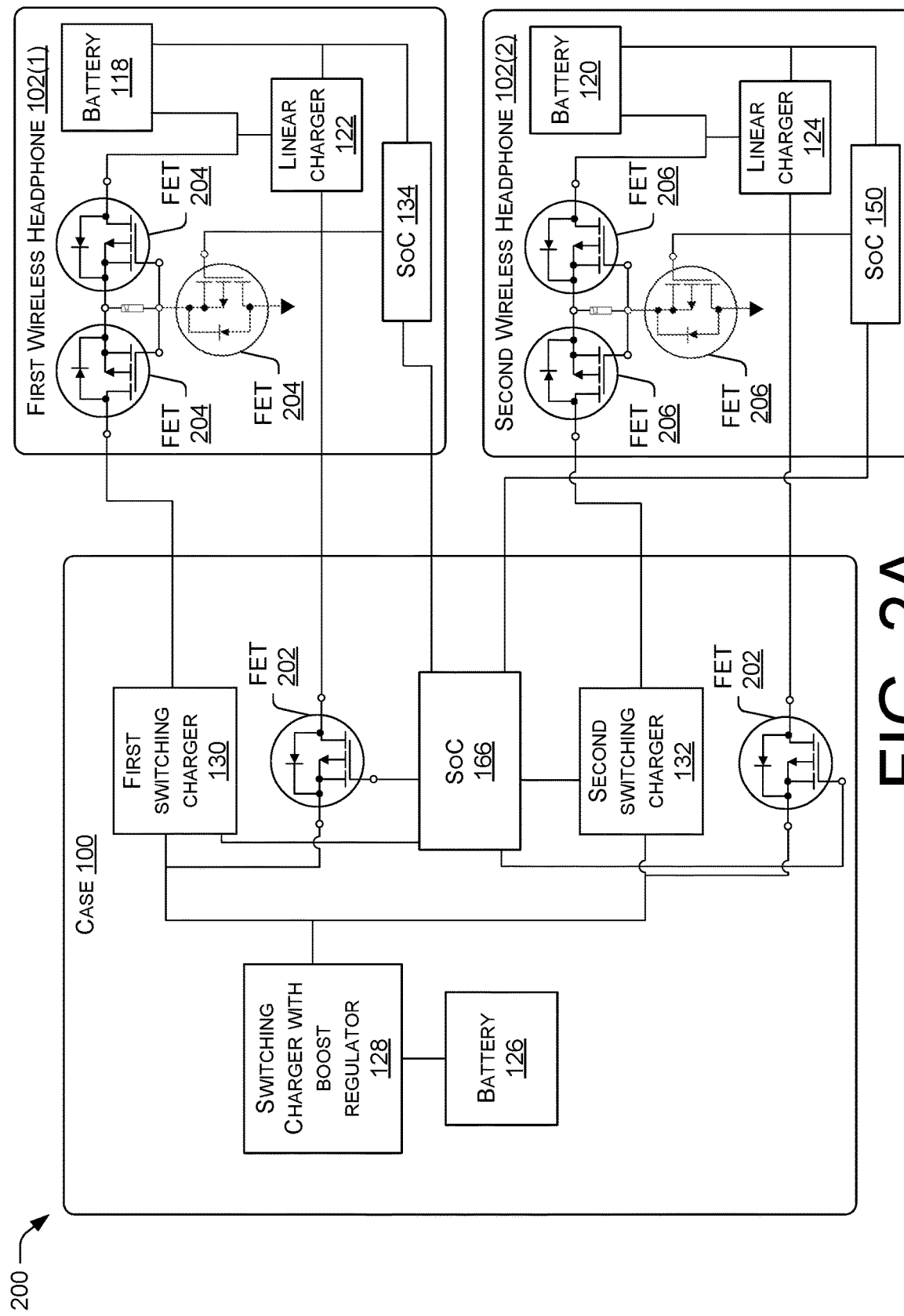
FIG. 2A illustrates an example architecture of the case and the wireless headphones, according to an embodiment of the present disclosure.
Figure 2B:
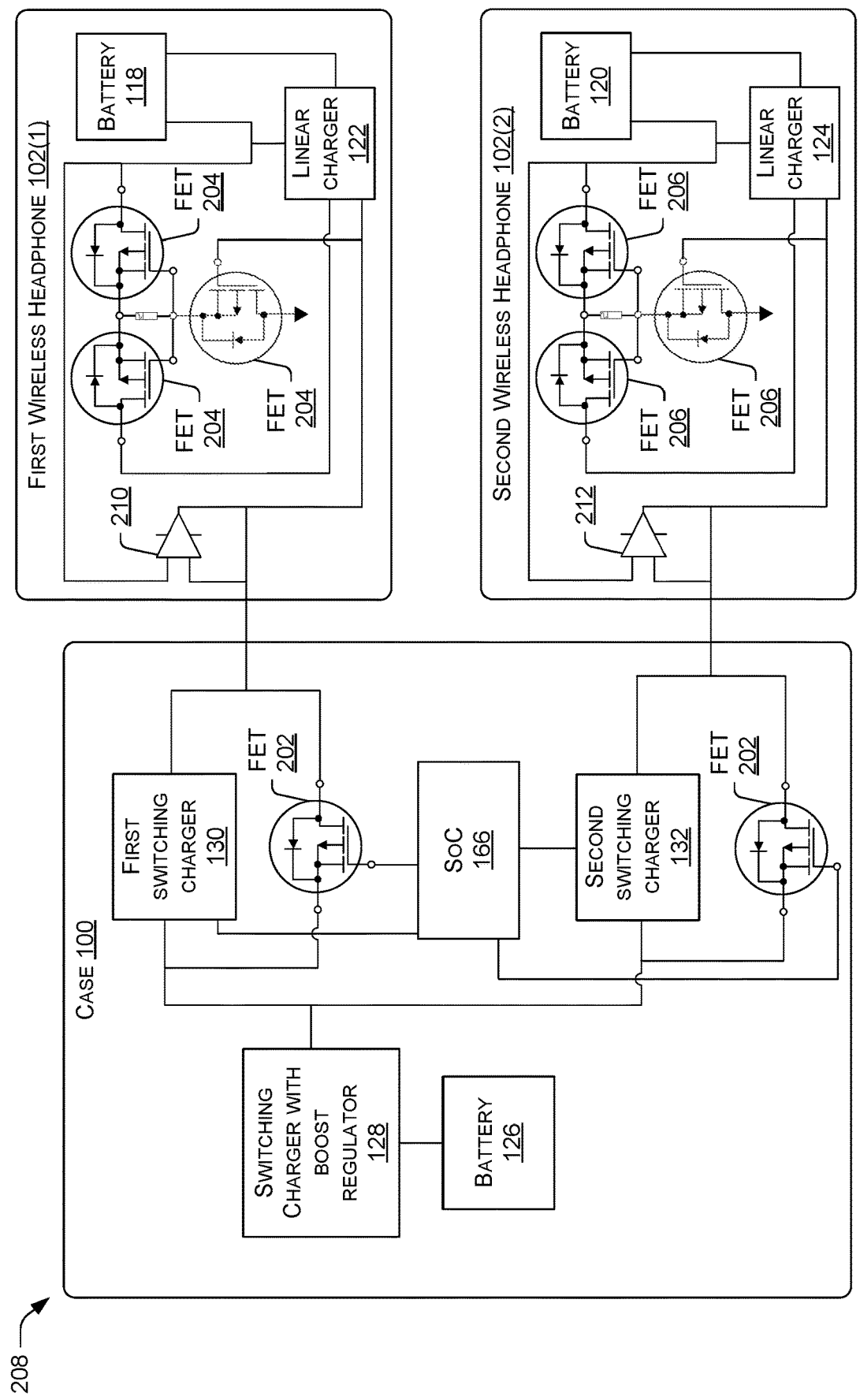
FIG. 2B illustrates an example architecture of the case and the wireless headphones, according to an embodiment of the present disclosure.
Figure 2C:
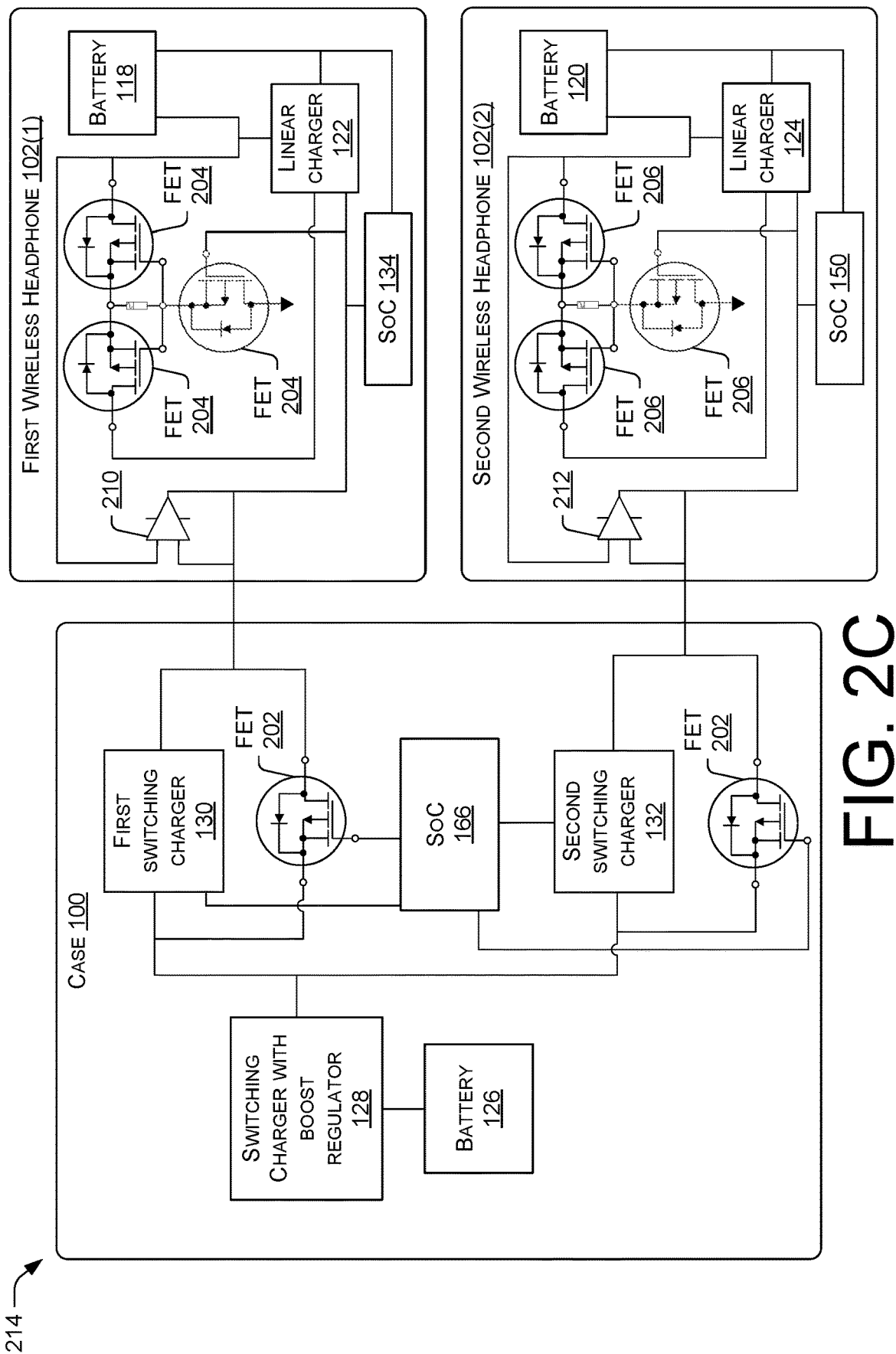
FIG. 2C illustrates an example architecture of the case and the wireless headphones, according to an embodiment of the present disclosure.

FIGS. 2A-2C illustrate example architectures of the case 100, the first wireless headphone 102(1), and the second wireless headphone 102 (2). The case 100 may include the battery 126, the switching charger with boost regulator 128, the first switching charger 130 for charging the first wireless headphone 102(1), and/or the second switching charger 132 for charging the second wireless headphone 102(2). The switching charger with boost regulator 128 may charge the battery 126 from power input to the case 100 (e.g., mains power and/or external source), and may also boost the voltage of the battery 126 for charging the first wireless headphone 102(1) and the second wireless headphone 102(2). Further, the first wireless headphone 102(1) may include the battery 118 and the linear charger 122, and the second wireless headphone 102(2) may include the battery 120 and the linear charger 124.

FIG. 2A illustrates an example architecture 200 showing the case 100 and the wireless headphones 102, respectively, including charging circuitry to permit charging of the battery 118 and the battery 120. For example, in a non-fast charging state (e.g., linear charging, constant voltage, etc.), such as when the linear charger 122 charges the battery 118 and the linear charger 124 charges the battery 120, FETs 202 (e.g., p-channel FETs (pFETs)) in the case 100 may be enabled. In some instances, the FETs 202 may include metal oxide semiconductor field-effect transistors (MOSFETs). In some instances, the SoC 166 may turn on the FETs 202 to enable the non-fast charging or linear charging. In other words, the SoC 166 may control, or disable the FETs 202 in the non-fast charging state. In doing so, power may bypass the first switching charger 130 and the second switching charger 132. Shown in FIG. 2, a first FET of the FETs 202 may be placed in parallel with the first switching charger 130 and a second FET of the FETs 202 may be placed in parallel with the second switching charger 132.

Additionally, in the non-fast charging state or linear charging state, FETs 204 in the first wireless headphone 102(1) and FETs 206 in the second wireless headphone 102(2) may be turned off, respectively. For example, the SoC 134 and the SoC 150 may respectively communicative with the FETs 204 and the FETs 206. In such instances, the linear charger 122 and the linear charger 124 may receive power for charging the battery 118 and the battery 120, respectively. As shown in FIG. 2, and in some instances, the FETs 204 and the FETs 206 may include two back-to-back FETs that are controlled by the SoC 134 and the SoC 150, respectively. In some instances, the FETs 204 and/or the FETs 206 may include pFETs and/or MOSFETs. In operation, the FET(s) 204 and/or the FETs 206 may act as a switching circuit to permit charging via the linear charger 122, the linear charger 124, the first switching charger 130, and the second switching charger 132. Accordingly, the FETs in the case 100, the first wireless headphone 102(1), and/or the second wireless headphone 102(2) may permit the battery 118 and the battery 120 to be charged via the linear charger 122 and the linear charger 124, respectively, and the first switching charger 130 and the second switching charger 132, respectively.

While the linear charger 122 charges the battery 118 and the linear charger 124 charges the battery 120, the first wireless headphone 102(1) and the second wireless headphone 102(2) may determine whether to charge at the fast charging state. In such instances, the wireless headphones 102 may respectively disable the linear charger 122 and the linear charger 124 and may communicate with the case 100 to enable fast charging. For example, the SoC 134 of the first wireless headphone 102(1) may cause the linear charger 122 to turn off and may communicate with the SoC 166 of the case 100 indicating such. Similarly, the SoC 150 of the second wireless headphone 102(2) may cause the linear charger 124 to turn off and may communicate with the SoC 166 of the case 100 indicating such. In some instances, the case 100, via the SoC 166, may disable one or both of the FETs 202 (depending on the battery level of first wireless headphone 102(1) and/or the second wireless headphone 102(2)) and enable the first switching charger 130 and the second switching charger 132. The case 100, via the SoC 166, may also transmit an indication to the first wireless headphone 102(1) and the second wireless headphone 102(2) indicating the fast charging. Upon receiving the indication that the first switching charger 130 and the second switching charger 132 are enabled, the first wireless headphone 102(1) and the second wireless headphone 102(2) may enable the FETs 204 and the FETs 206, respectively. Therein, the battery 118 and the battery 120 may be fast charged via the first switching charger 130 and the second switching charger 132, respectively.

During the fast charging state, the wireless headphones 102 may respectively monitor a charge or voltage of the battery 118 and the battery 120. For example, when the battery 118 and the battery 120 reach a threshold voltage level or battery percentage, the wireless headphones 102 may respectively switch to a non-fast charging state or constant voltage state. In such instances, the first wireless headphone 102(1) may disable the FETs 204 and the second wireless headphone 102(2) may disable the FETs 206. Additionally, the first wireless headphone 102(1) and the second wireless headphone 102(2) may transmit indications, or requests, to the case 100 to disable the fast charging via the first switching charger 130 and/or the second switching charger 132. Upon receiving the indications, the case 100 may disable the first switching charger 130 and the second switching charger 132, while turning on the FETs 202. In some instances, the case 100 may transmit indications of such to the first wireless headphone 102(1) and the second wireless headphone 102(2) and upon receiving the indication from the case 100, the first wireless headphone 102(1) may enable the linear charger 122 to charge the battery 118 and the second wireless headphone 102(2) may enable the linear charger 124 to charge the battery 120. In some instances, charging in the non-fast charging state or constant voltage state may continue until the wireless headphones 102 are fully charged.

Moreover, at any point in the charging process (e.g., via the linear chargers or the fast switching chargers), the first wireless headphone 102(1) and/or the second wireless headphone 102(2) may be removed from the case 100. In instances where the first wireless headphone 102(1) and/or the second wireless headphone 102(2) detects a disconnection from the case 100, the first wireless headphone 102(1) and the second wireless headphone 102(2) may disable the FETs 204 and the FETs 206, respectively. Disabling the FETs 204 and the FETs 206 may prevent damage to the battery 118 and the battery 120, respectively. Moreover, the case 100 may also detect the disconnection of the wireless headphones 102 and disable the FETs 202 and charging via the first switching charger 130 and/or the second switching charger 132.

Although the architecture 200 illustrates the switching charger with boost regulator 128, the first switching charger 130, the second switching charger 132, and/or the FETs 202 as different components, in some instances, the switching charger with boost regulator 128, the first switching charger 130, the second switching charger 132, and/or the FETs 202 may be combined on a singular chip, integrated circuit, or charge controller. Additionally, or alternatively, in some instances, the first switching charger 130 and/or the second switching charger 132 may include boost regulators or bucks, respectively. Moreover, while the architecture 200 illustrates the case 100 including a certain number of switching chargers, switching chargers with boost regulator, batteries, or FETs, the architecture 200 may include a lesser or greater number of switching chargers, switching chargers with boost regulator, batteries, or FETs. For example, the architecture 200 may include an additional switching charger and/or an additional FET for charging an additional electronic device, such as a mobile phone. Additionally, or alternatively, although the SoC 134 and the linear charger 122 are shown as separate components, and the SoC 150 and the linear charger 124 are shown as separate components, the SoC 134 and the SoC 150 may include the linear charger 122 and the linear charger 124, respectively. Additionally, the FETs 204 and/or the FETs 206 may be integrated into a FET switch package, integrated silicon switch having a four-pin package, or a load switch.

FIG. 2B illustrates an example architecture 208. In some instances, the architecture 208 may include similar components as the architecture 200. However, the architecture 208 is shown including a less connections, or contacts, between the case 100 and the first wireless headphone 102(1), and the case 100 and the second wireless headphone 102(2). For example, compared to the architecture 200 that includes two contacts between the case 100 and the wireless headphones 102, respectively, for transferring a charge, the architecture 208 includes a single connection or contact for fast charging and linearly charging the wireless headphones 102, respectively. In other words, the single contact may be used to linearly charge (i.e., via the linear charger 122 and the linear charger 124, respectively) and fast charge the wireless headphones 102 (i.e., via the first switching charger 130 and the second switching charger 132, respectively).

The architecture 208 also illustrates the SoC 134 and the SoC 150 being removed from the first wireless headphone 102(1) and the second wireless headphone 102(2), respectively. In such instances, the wireless headphones 102 may respectively receive a charge (e.g., power, current, etc.), and based on characteristics of the charge, may charge the battery according to a certain mode. For example, the first wireless headphone 102(1) may include a comparator 210 (e.g., window comparator(s)) and the second wireless headphone 102(2) may include a comparator 212 (e.g., window comparator(s)) that function to charge the wireless headphones 102, respectively, at different modes or states. The comparator 210 and/or the comparator 212 may enable direct charging of the battery 118 and the battery 120, respectively, when the voltage received from the case 100 is within a predetermined threshold of the battery voltage. For example, the comparator 210 and the comparator 212 may respectively determine the voltage of the battery 118 and the battery 120, and may fast charge the battery 118 and the battery 120 in instances where the input voltage is approximately (or substantially similar as) the battery voltage, and may linearly charge the battery 118 and the battery 120 in instances where the input voltage differs from the battery voltage by more than a threshold. In some instances, the comparator 210 and/or the comparator 212 may turn on/off the FETs 204 and/or the FETs 206 (or the load switch), respectively. For example, the comparator 210 and the comparator 212 may turn on one or more of the FETs 204 and one or more of the FETs 206, respectively, when the input voltage from the case 100 is within a certain threshold of the voltage of the battery 118 and the battery 120, respectively. Additionally, the comparator 210 and the comparator 212 may turn off one or more of the FETs 204 and one or more of the FETs 206, respectively, when the input voltage from the case 100 is outside a certain threshold of the voltage of the battery 118 and the battery 120, respectively.

The architecture 208 further illustrates the connection or contact between the SoC 134, the SoC 150, and the SoC 166 being absent. Instead, in some instances, noted above, the comparator 210 and/or the comparator 212 may regulate or control charging of the battery 118 and the battery 120, respectively.

FIG. 2C illustrates an example architecture 214. In some instances, the architecture 214 may include similar components as the architecture 200 and/or the architecture 208. The architecture 214 is shown including the comparator 210 and the comparator 212 for enabling linear charging and fast charging of the wireless headphones 102. In some instances, the SoC 166 may a current load of the battery 118 and the battery 120 and determine the battery voltage, respectively. In some instances, if the voltage of the battery 118 and/or the battery 120 is too low, or below a threshold, the case 100 may increase a voltage to linearly charge the wireless headphones 102 via trickle charging. In turn, when the voltage of the battery 118 and/or the battery 120 reaches a threshold, the case 100 may enable a higher voltage transmission to enable linearly charging of the wireless headphones 102 via constant voltage.

FIG. 3 illustrates an example charging profile 300 showing charging stages for charging the battery 118 and the battery 120. In some instances, depending on the charge level, or battery life, of the battery 118 and the battery 120, respectively, the first wireless headphone 102(1) and the second wireless headphone 102(2) may charge at a particular rate, speed, state, or stages.

The charging profile 300 illustrates two charts. A first chart 302 illustrates voltage of the battery 118 and/or the battery 120 (Y-axis) over time (X-axis). A second chart 304 illustrates current supplied to the battery 118 and/or the battery 120 (Y-axis) over time (X-axis), via a linear charger (i.e., the linear charger 122 and the linear charger 124) and a switching charger (i.e., the first switching charger 130 and the second switching charger 132). Initially, the charging profile 300 (or the first chart 302 and the second chart 304) assumes that the battery 118 and/or the battery 120 is discharged to zero voltage (i.e., dead). However, depending on the voltage of the battery 118 and/or the battery 120, different charging stages may be implemented.

At zero voltage, represented at time $T_0$, the case 100 may provide a constant current to the linear charger 122 and/or 124 for charging the battery 118 and the battery 120 at a constant rate. As such, between the time period of $T_0$ and $T_1$, the voltage of the battery 118 and the battery 120 may linearly increase (i.e., the wireless headphones 102 may be linearly charged). Such charging between the time period of $T_0$ and $T_1$ may be referred to as trickle charging (or a trickle charge state). Trickle charging delivers a charge (e.g., 5V/0.5 A) that may be equal to a self-discharge rate, slowly charging the battery 118 and/or the battery 120 and/or preventing off-gassing, which may prevent overcharging and safely condition the battery 118 and/or the battery 120 for faster charging. In some instances, trickle charging may continue until the battery 118 and/or the battery 120 reaches one percent of the voltage of the battery 118 and/or the battery 120, respectively. Additionally, or alternatively, in some instances the wireless earbuds 102 may be trickled charged by default upon connecting to the case 100.

After trickle charging, the battery 118 and/or the battery 120 may be pre-charged between the time period of $T_1$ and $T_2$. During pre-charging, the linear charger 122 and the linear charger 124 may be charge the battery 118 and the battery 120, respectively, at an increased constant current 12 (e.g., 5V/0.9 A). Pre-charging may prevent overheating of the battery 118 and the battery 120 by recovering the passivating layer within the battery 118 and the battery 120, respectively. In some instances, pre-charging may occur until the voltage in the battery 118 and/or the battery 120 is at a second voltage threshold, or second battery life, such as thirty percent.

After pre-charging, between the time period of $T_2$ and $T_3$, the battery 118 and/or the battery 120 may be fast charged. Shown in the charging profile 300, fast charging via the first switching charger 130 and the second switching charger 132 may provide an increase current 13 (e.g., 5V/2 A) and/or voltage than compared to the current and/or voltage during the trickle charge and pre-charge states. Providing the increased current and/or voltage may serve to reduce a charging time of the first wireless headphone 102(1) and the second wireless headphone 102(2). In some instances, fast charging may occur until the battery 118 and the battery 120 reach, respectively, a threshold voltage level, or threshold percentage of the voltage of the battery 118 and the battery 120, respectively. In some instances, fast charging may occur until the battery 118 and/or the battery 120 is seventy, eighty, or ninety percent charged (based on characteristics of the battery 118, the battery 120, and/or the charging circuitry, respectively).

After the fast charging, between the time period of $T_3$ and $T_4$, the battery 118 and/or the battery 120 may be charged via a constant voltage state until fully charged (e.g., 100 percent) via the linear charger 122 and the linear charger 124, respectively. During the constant voltage sate, in some instances, the case 100 may provide five volts to the linear charger 122 and/or the linear charger 124. In some instances, the constant charging between the time period of $T_3$ and $T_4$ may prevent the battery 118 and the battery 120 being overcharged. The linear charger 122 and the linear charger 124 may monitor the amount of current supplied to the battery 118 and the battery 120, and may slowly decay the current until the current is sufficiently small (or below a threshold), such as when the current drops to three percent of the rated current for the battery 118 and the battery 120, as shown in the second chart 304. Shown in FIG. 3, the voltage of the battery 118 and/or the battery 120 may slowly increase to $V_4$, which may represent a full charge.

Throughout the charging process, the first wireless headphone 102(1) and the second wireless headphone 102(2) may communicate with the case 100 for determining or enabling the trickle charging, the pre-charging, the fast charging, and/or the constant voltage charging. In such instances, based on the battery level, the first wireless headphone 102(1) and the second wireless headphone 102(2) may instruct the case 100 to provide certain currents or voltages for charging the battery 118 and the battery 120, respectively. Additionally, noted above, depending on the charging stages, circuitry within case 100, the first wireless headphone 102(1), and/or the second wireless headphone 102(2) may be enabled and disabled, respectively, to permit trickle charging, pre-charging, and/or fast-charging.

It should be noted that, although the example of FIG. 3 illustrates the first wireless headphone 102(1) and the second wireless headphone 102(2) receiving the same voltage and/or the same current during the same time periods, in other examples, the first wireless headphone 102(1) may the charge differently than the second wireless headphone 102(2). For example, the case 100 may trickle charge the first wireless headphone 102(1) during a first period of time and trickle charge the second wireless headphone 102(2) during a second, different period of time. In some instances, the second period of time may include a portion of the second period of time.

Additionally, the case 100 may fast charge the first wireless headphone 102(1) during a third period of time and fast charge the second wireless headphone 102(2) during a fourth, different period of time. In some instances, the fourth period of time may include at least a portion of the first period of time and/or the third period of time. In some instances, the third period of time may include at least a portion of the second period of time and/or the fourth period of time. Furthermore, the case 100 may constant charge the first wireless headphone 102(1) during a fifth period of time and constant charge the second wireless headphone 102(2) during a sixth, different period of time. In some instances, the fifth period of time may include at least a portion of the second period of time, the fourth period of time, and/or the sixth period of time. In some instances, the sixth period of time may include at least a portion of the first period of time, the second period of time, and the fifth period of time.

In these examples, $T_0$, $T_1$, $T_2$, $T_3$, and/or $T_4$ associated with charging the first wireless headphone 102(1) may be different than the $T_0$, $T_1$, $T_2$, $T_3$, and/or $T_4$ associated with charging the second wireless headphone 102(2).

Figure 4A:
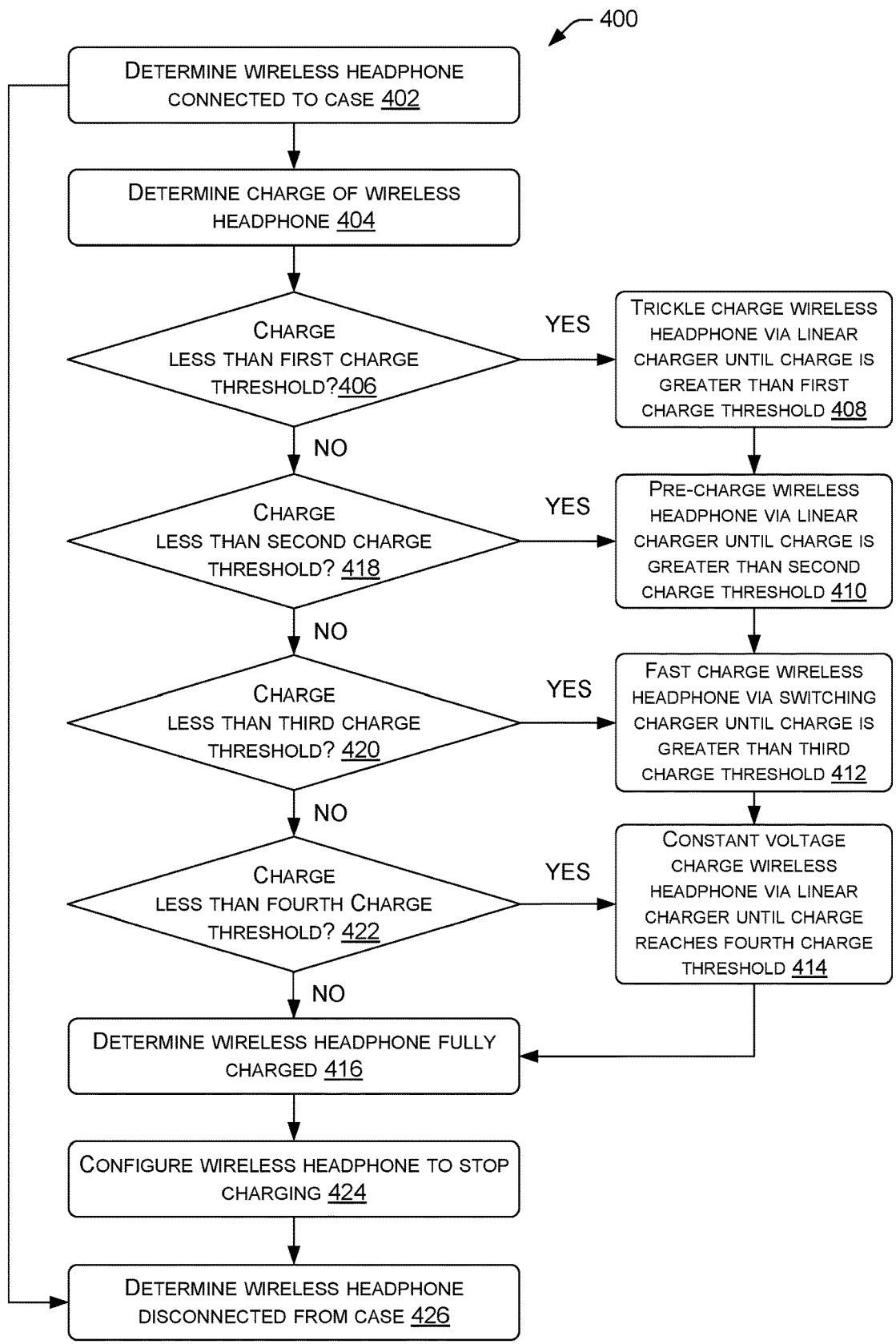
FIG. 4A illustrates an example process for charging the wireless headphones, according to an embodiment of the present disclosure.
Figure 4B:
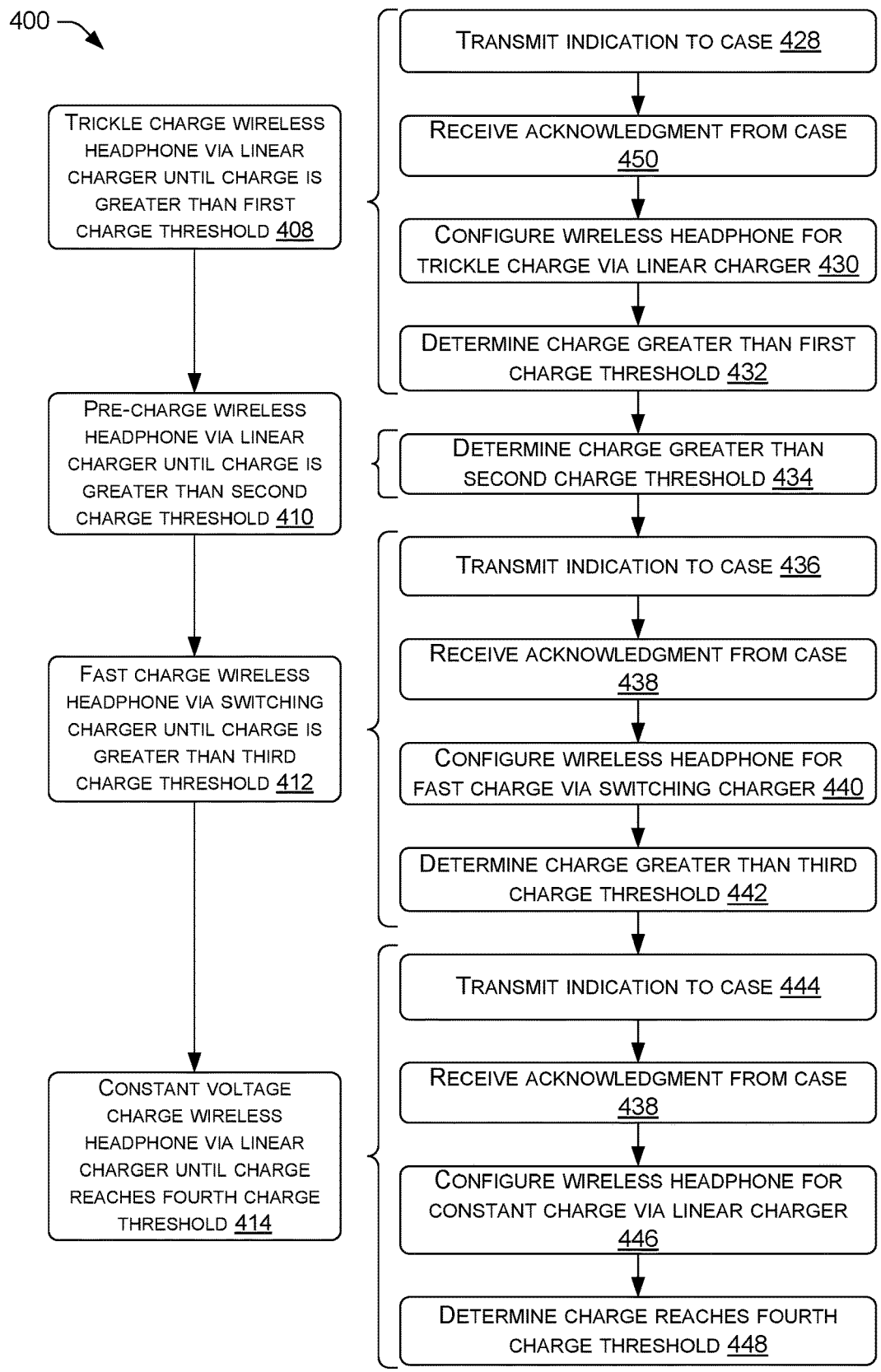
FIG. 4B illustrates an example process for charging the wireless headphones, according to an embodiment of the present disclosure.
Figure 5:
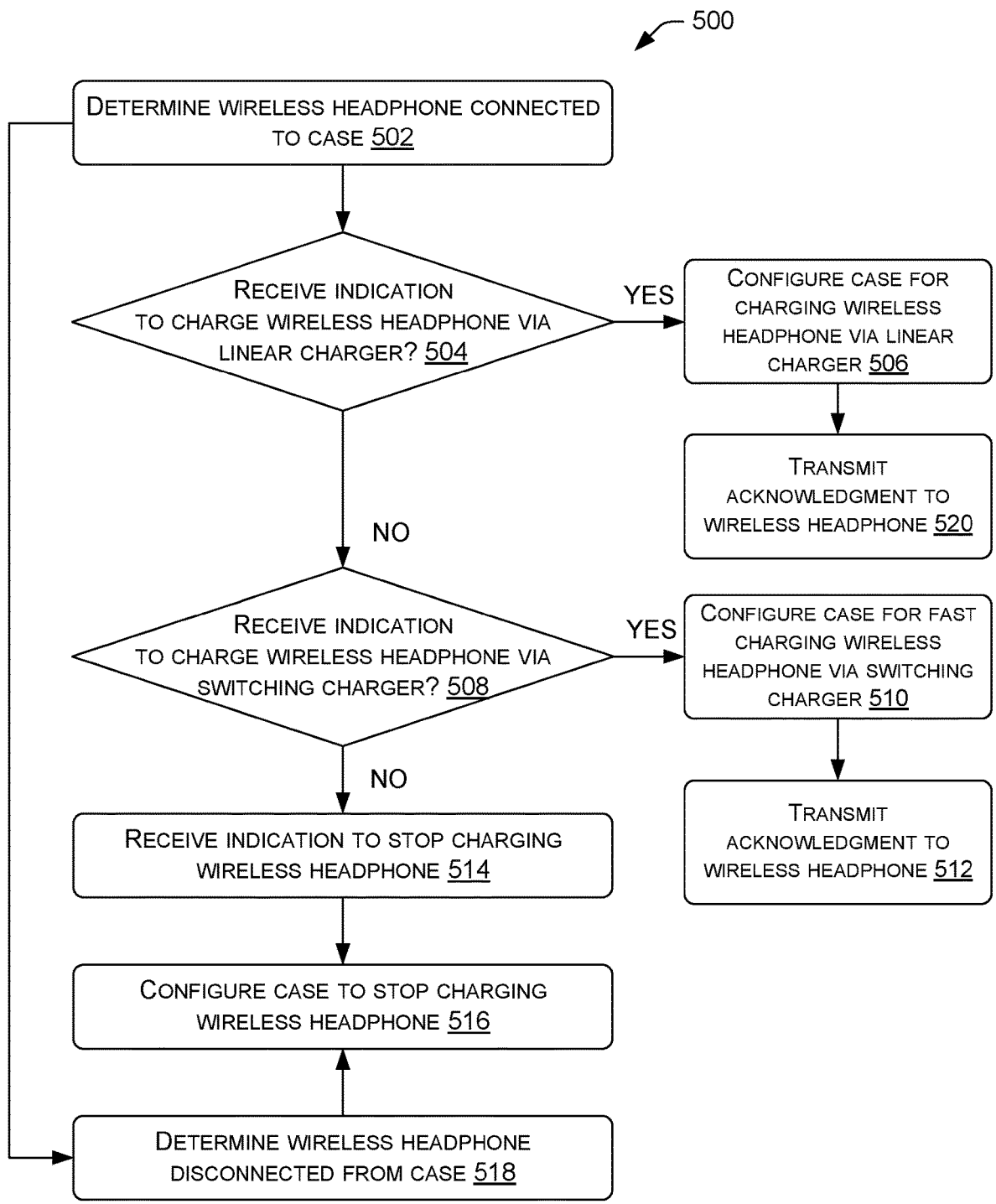
FIG. 5 illustrates an example process for charging the wireless headphones, according to an embodiment of the present disclosure.

FIGS. 4A, 4B, and 5 illustrate various processes related to charging electronic device(s), such as the wireless headphones 102. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures, and systems.

FIGS. 4A and 4B illustrates a process 400 for charging wireless headphones, such as the wireless headphones 102. In some instances, the process 400 may be performed by the first wireless headphone 102(1) and/or the second wireless headphone 102(2) for charging the battery 118 and the battery 120, respectively.

At 402, the process 400 may determine that a wireless headphone is connected to a case. For example, the wireless headphone may determine, or receive an indication, of a connection with the case 100 (e.g., via contacts).

At 404, the process 400 may determine a charge of a battery of the wireless headphone. For example, upon connecting to the case 100, the wireless headphone may determine a charge (e.g., voltage and/or current) of the battery, a battery life (e.g., 20 percent), a remaining charge (10 percent), and so forth.

At 406, the process 400 may determine whether the charge is less than a first charge threshold. For example, the wireless headphone may compare the charge (e.g., voltage and/or current) of the wireless headphone with the first charge threshold (e.g., first voltage threshold and/or first current threshold) to determine whether the charge is greater than or less than the first charge threshold. If at 406, the process 400 determines that the charge is less than the first charge threshold, the process 400 may follow the "YES" route and proceed to 408.

At 408, the process 400 may trickle charge the wireless headphone via a linear charger and until the charge of the battery reaches the first charge threshold. For example, at 408, the wireless headphone may receive the charge at a certain voltage or current from the case 100 to charge the battery (i.e., the battery 118 or the battery 120) via the linear charger (i.e., the linear charger 122 or the linear charger 124) until the charge reaches the first charge threshold. As an example, the linear charger may charge the battery until the battery reaches a first voltage threshold and/or until the current supplied to the battery reaches a first current threshold (e.g., via a coulomb counter). Trickle charging the wireless headphone may include the linear charger charging the wireless headphone at a constant rate (e.g., voltage and/or current) until the first charge threshold or the first battery percentage to safely condition the battery of the wireless headphone. Moreover, discuss above, the linear charger may dissipate power received from the case 100 to regulate a voltage supplied to the battery to charge at correct rates.

At 410, the process 400 may pre-charge the wireless headphone via the linear charger and until the charge of the battery reaches a second charge threshold. For example, at 410, the wireless headphone may receive a charge (e.g., voltage and current) from the case 100 and may charge the battery via the linear charger until the charge reaches the second charge threshold (e.g., second voltage threshold and/or second current threshold). In some instances, the voltage and/or current received from the case 100 at 410 may be greater than the voltage and/or current received at 408, respectively. Accordingly, at 410, the wireless headphone may charge the battery at an increased rate compared to 408.

At 412, the process 400 may fast charge the wireless headphone via a switching charger until the charge of the battery reaches a third charge threshold. For example, the switching charger (i.e., the first switching charger 130 or the second switching charger 132) may charge the battery until the charge reaches the third charge threshold (e.g., third voltage threshold and/or third current threshold). In some instances, the voltage and/or current charging the battery at 412 may be greater than the voltage and/or current at 410, respectively. In some instances, the switching charger may charge the battery to a charge greater than the third voltage threshold.

At 414, the process 400 may charge the wireless headphone at a constant voltage via the linear charger until the charge of the battery reaches a fourth charge threshold. For example, at 414, the wireless headphone may receive a charge (e.g., voltage and current) from the case 100 and may charge the battery via the linear charger until the charge reaches the fourth charge threshold (e.g., fourth voltage threshold and/or fourth current threshold). In some instances, the voltage and/or current that charges the battery at 414 may be greater than the voltage and/or current received at 412, respectively. Moreover, in some instances, at 412, the battery may be charged to charge threshold that is greater than the third charge threshold.

At 416, the process 400 may determine that the wireless headphone is fully charged. For example, based at least in part on the charge reaching the fourth voltage threshold, the process 400 may determine that the battery of the wireless headphone is fully charged. In some instances, the linear charger may determine an amount of current supplied to the battery for determining that the battery is at the fourth charge threshold, or fully charged. For example, when the current becomes sufficiently small, or below a predetermined amount, the linear charger may stop (e.g., cease) charging the battery. For example, the amount of voltage and current passed to the battery, via the linear charger, may be controlled via the SoC of the wireless headphone.

Alternatively, at 406, if the process 400 determines that the charge of the battery is not less than the first charge threshold, the process 400 may follow the "NO" route and proceed to 418.

At 418, the process 400 may determine whether the charge is less than the second charge threshold. For example, the wireless headphone may compare the charge of the wireless headphone with the second charge threshold to determine whether the charge is greater than or less than the second charge threshold. If at 418, the process 400 determines that the charge is less than the second charge threshold, the process 400 may follow the "YES" route and proceed to 410. Alternatively, if at 418 the process 400 determines that the charge is not less than the second charge threshold, the process 400 may proceed to 420.

At 420, the process 400 may determine whether the charge is less than the third charge threshold. For example, the wireless headphone may compare the charge of the wireless headphone with the third charge threshold to determine whether the charge is greater than or less than the third charge threshold. If at 420, the process 400 determines that the charge is less than the third charge threshold, the process 400 may follow the "YES" route and proceed to 412. Alternatively, if at 420 the process 400 determines that the charge is not less than the third charge threshold, the process 400 may proceed to 422.

At 422, the process 400 may determine whether the charge is less than the fourth charge threshold. For example, the wireless headphone may compare the charge of the wireless headphone with the fourth charge threshold to determine whether the charge is greater than or less than the fourth charge threshold. If at 422, the process 400 determines that the charge is less than the fourth charge threshold, the process 400 may follow the "YES" route and proceed to 414. Alternatively, if at 420 the process 400 determines that the charge is not less than the fourth charge threshold, the process 400 may proceed to 416.

From 416, at 424, the process 400 may configure the wireless headphone to stop (e.g., cease) charging. For example, based at least in part on determining that the wireless headphone is fully charged, the wireless headphone may configure to stop (e.g., cease) charging and/or otherwise prevent charging. In some instances, configuring the first wireless headphone to stop (e.g., cease) charging may include disabling charging circuitry of the wireless headphone (e.g., FET(s)).

As shown, in some instances, the process 400, from 402, may proceed to 426, whereby the process 400 may determine that the wireless headphone is disconnected, or has disconnected, from the case 100. For example, the wireless headphone may determine or receive an indication that the wireless headphone has disconnected from the case 100. In such instances, the process 400 may proceed to 424 to configure the wireless headphone to stop (e.g., cease) charging. For example, at any point in the charging process (e.g., via the linear charger or the fast switching charger), the wireless headphone may be removed from the case 100. In such instances instances the wireless headphone may disable charging circuitry (e.g., the FETs 204 or the FETs 206) to prevent damage to the battery FIG. 4B illustrates detailed steps associated with 408, 410, 412, and 414 of FIG. 4A.

At 408, trickle charging the wireless headphone via the linear charger until the charge is greater than the first charge threshold may include sub-blocks 428, 430, and/or 432.

At 428, the process 400 may transmit an indication to the case 100 indicating the charge (e.g., voltage) of the battery is less than the first charge threshold. For example, the wireless headphone may transmit (e.g., via one or more of the contacts 112 or the contacts 116) an indication to the case 100 that informs the case 100 of the voltage of the battery and/or instructs the case 100 to perform certain actions. For example, upon receiving the indication from the wireless headphone, the case 100 may configure and/or enable/disable certain components (e.g., charging circuitry) for charging the wireless headphone via the linear charger. For example, the case 100 may disable the fast charging and/or supply a charge (i.e., voltage and current) for linear charging at the trickle charge state.

At 450, the process 400 may receive an acknowledgement from the case. For example, the wireless headphone may receive an acknowledgement from the case 100 indicating that the case 100 will provide an associated voltage and current for trickle charging the wireless headphone via the linear charger. In some instances, the wireless headphone may wait to configure for trickle charging until the acknowledgement is received from the case 100.

At 430, the process 400 may configure the wireless headphone for trickle charging via the linear charger. For example, the wireless headphone may configure and/or enable/disable certain components (e.g., charging circuitry) for charging the wireless headphone via the linear charger. In some instances, the wireless headphone may disable the FETs (e.g., the FETs 204 or the FETs 206, respectively) such that the wireless headphone is charged via the linear charger. For example, a SoC of the wireless headphone (e.g., the SoC 134 or the SoC 150) may communicate with the FETs. In such instances, the linear charger may receive power from the case 100 for charging the battery.

At 432, the process 400 may determine that the charge is greater than the first charge threshold. For example, based at least in part on trickle charging the wireless headphone at a predetermined voltage and current, the wireless headphone may determine when the charge of the battery is greater than the first voltage threshold, or has reached the first charge threshold. In some instances, the SoC of the wireless headphone may measure the battery's cell current and voltage, and determine the first charge threshold is satisfied.

At 410, pre-charging the wireless headphone via the linear charger until the charge is greater than the second charge threshold may include sub-block 434. At 434, the process 400 may determine that the charge of the battery is greater than the second charge threshold, or has reached the second charge threshold. For example, based at least in part on pre-charging, the wireless headphone may determine that the voltage of the battery is greater than the second charge threshold (or second voltage threshold). In some instances, the wireless headphone may already be configured for charging via the linear charging based at least in part on trickle charging the wireless headphone. In some instances, during pre-charge, the wireless headphone may receive and/or charge the battery at an increased voltage or current. However, in some instances, depending on the voltage of the battery, if pre-charging the wireless headphone does not succeed the trickle charging, the wireless headphone may configure for pre-charging via the linear charger. In some instances, configuring the wireless headphone for pre-charging may include similar sub-blocks as those illustrated at 408, including transmitting an indication to the case 100 informing the case 100 that the wireless headphone will charge via the linear charger and to supply a certain current or voltage of the linear charger. In some instances, the wireless headphone may transmit an instruction to the case 100 to increase the voltage and/or current for pre-charging the wireless headphone. In some instances, the wireless headphone may wait to configure for pre-charging until an acknowledgement is received from the case 100. For example, the wireless headphone may transmit an indication associated with pre-charging, and may wait until an acknowledgment is received from the case 100 indicating that the case will provide an associated voltage and current for pre-charging the wireless headphone via the linear charger.

At 412, fast charging the wireless headphone via the switching charger until the charge is greater than the third charge threshold may include sub-blocks 436, 438, 440, and/or 442.

At 436, the process 400 may transmit an indication to the case 100 that indicates the charge of the battery is greater than the second charge threshold. For example, the wireless headphone may transmit an indication to the case 100, whereby the indication may serve to inform the case 100 of the charge of the battery and/or instruct, or request, the case 100 to perform certain actions. In such instances, while the linear charger charges the wireless headphone, the wireless headphone may determine whether to charge at the fast charging state. Upon receiving the indication (or request) from the wireless headphone, the case 100 may configure and/or enable/disable certain components (e.g., charging circuitry) for charging the wireless headphone via the switching charger and via the fast charging.

At 438, the process 400 may receive an acknowledgment from the case indicating that the case has configured (or will configure) to fast charge the wireless headphone via the switching charger. For example, the wireless headphone may receive the acknowledgment from the case 100 that the case 100 has configured, is configuring, or will configure to fast charge the wireless headphone.

At 440, the process 400 may configure the wireless headphone for fast charging. For example, the wireless headphone may configure and/or enable/disable certain components (e.g., charging circuitry) for charging via the switching charger. In some instances, the wireless headphone may configure for fast charging based at least in part on receiving the acknowledgment from the case (438) that the switching charger is enabled. In some instances, configuring the wireless headphone for fast charging may include disabling the linear charger and communicating with the case 100 to enable fast charging, as noted above. For example, the SoC of the wireless headphone may cause the linear charger to turn off and may communicate with the SoC the case 100 indicating such. Additionally, the wireless headphone may turn on and/or enable FETs within the wireless headphone for fast charging. Therein, the battery may be fast charged via the switching charger.

At 442, the process 400 may determine that the charge is greater than the third charge threshold. For example, based at least in part on fast charging the wireless headphone, the wireless headphone may determine when the voltage of the battery is greater than the third charge threshold, or has reached the third voltage threshold.

At 414, constant charging the wireless headphone via the linear charger until the charge reaches the fourth charge threshold may include sub-blocks 444, 446, and/or 448. At 444, the process 400 may transmit an indication to the case 100 that indicates the charge of the battery is less than the fourth charge threshold. For example, the wireless headphone may transmit an indication to the case 100 that informs the case 100 of the charge of the battery and/or instructs the case 100 to perform certain actions. For example, upon receiving the indication from the wireless headphone, the case 100 may configure and/or enable/disable certain components (e.g., charging circuitry) for charging the wireless headphone via the linear charger. In some instances, the wireless headphone may wait to configure for constant charging until an acknowledgement is received from the case 100. For example, the wireless headphone may transmit an indication associated with constant charging, and may wait until an acknowledgment is received from the case 100 indicating that the case will provide an associated voltage and current for constant charging the wireless headphone via the linear charger.

At 452, the process 400 may receive an acknowledgement from the case.

For example, the wireless headphone may receive an acknowledgement from the case 100 indicating that the case 100 will provide an associated voltage and current for trickle charging the wireless headphone via the linear charger. In some instances, the wireless headphone may wait to configure for trickle charging until the acknowledgement is received from the case 100.

At 446, the process 400 may configure the wireless headphone for constant charging via the linear charger. For example, the wireless headphone may configure and/or enable/disable certain components (e.g., charging circuitry) for charging the wireless headphone via the linear charger. In some instances, the wireless headphone may disable the FETs (e.g., the FETs 204 or the FETs 206, respectively) such that the wireless headphone is charged via the linear charger. For example, a SoC of the wireless headphone (e.g., the SoC 134 and the SoC 150) may communicate with the FETs. In such instances, the linear charger may receive power from the case 100 for charging the battery.

At 448, the process 400 may determine that the charge reaches the fourth charge threshold. For example, based at least in part on charging the wireless headphone of the constant voltage, the wireless headphone may determine when the voltage of the battery reaches, or satisfies, the fourth voltage threshold.

Although the process 400 is described with charging a wireless headphone, such as the first wireless headphone 102(1) or the second wireless headphone 102(2), it is to be understood that both wireless headphones 102 (i.e., the first wireless headphone 102(1) and the second wireless headphone 102(2)) may perform the process 400 for charging the battery 118 and the battery 120, respectively, to recharge simultaneously.

Moreover, during charging, either via the linear charger and/or the switching charger, the SoC of the wireless headphone may measure temperature of the battery to manage the amount of current being delivered to the battery, which may optimize the charge speed of the battery and/or prevent damage to the battery (e.g., overheating). For example, in some instances, if the wireless headphone is too hot, or above a threshold temperature, the wireless headphone may reduce a current being output by the linear charger, may terminate charging, and/or may cause the switching charger to reduce a current being output to the battery. Accordingly, throughout charging, the wireless headphone and the case 100 may be in communication to charge the battery at different speeds based on the needs of the battery and to maximize charging efficiency.

FIG. 5 illustrates an example process 500 for charging wireless headphones, such as the first wireless headphone 102(1) and/or the second wireless headphone 102(2). In some instances, the process 500 may be performed by a case, or charger, such as the case 100.

At 502, the process 500 may determine that the wireless headphone is connected to the case. For example, the case 100 may determine, or receive an indication, that the wireless headphone is connected or has connected to the case 100.

At 504, the process 500 may determine whether an indication is received associated with charging the wireless headphone via a linear charger. For example, the case 100 may determine whether the case 100 received an indication indicating the wireless headphone is to be charged via the linear charger (e.g., via one or more of the first contacts 110 and/or the second contacts 114, respectively). If at 504, the process 500 determines that the wireless headphone is to be charged via the linear charger, the process 500 may follow the "YES" route and proceed to 506.

At 506, the process 500 may configure the case for charging the wireless headphone via the linear charger. For example, the case 100 may configure the case 100 to charge the wireless headphone via the linear charger and/or disable fast charging via the switching charger. In such instances, the case 100 may transfer a charge (i.e., voltage and current) to the wireless headphone via contacts (e.g., one or more of the first contacts 110 or the second contacts 114) for enabling the linear charger of the wireless headphone to charge the battery. In some instances, configuring the case 100 for charging via the linear charger may include supplying power to the wireless headphone at decreased voltages or currents. For example, the case 100 may enable the FETs 202 such that power may route through the linear charger for charging the wireless headphone. In some instances, the SoC 166 may turn on the FETs 202 to enable the non-fast charging, or linear charging, such that power by bypass the switching charger. Additionally, in some instances, the case 100 may have a voltage above/below a voltage at which the case 100 is to supply the wireless headphone and the switching charger with boost regulator 128 may buck/boost the voltage of the battery 126 before the case 100 supplies power to the wireless headphone 102. In some instances, the case 100 may transmit an acknowledgement at 520 indicating that the case 100 will supply an associated charge (voltage and current) associated with charging via the linear charger.

Alternatively, if at 504 the process 500 determines that an indication to charge the wireless headphone via the linear charger was not received, the process 500 may follow the "NO" route and proceed to 508.

At 508, the process 500 may determine whether an indication is received indicating that the wireless headphone is to be charged via a switching charger. For example, the case 100 may determine whether the case 100 received an indication (or request) associated with charging the wireless headphone via the switching charger. If at 508, the process 500 determines that the wireless headphone is to be charged via the switching charger, the process 500 may follow the "YES" route and proceed to 510.

At 510, the process 500 may configure the case for charging the wireless headphone via the switching charger. For example, the case 100 may configure for charging the wireless headphone charging via the switching charger. In some instances, configuring the case 100 for fast charging may involve disabling FETs in the case (e.g., the FETs 202) for routing power directly from the case 100 to the battery of the wireless headphone. In other words, the SoC 166 may control, or disable the FETs 202 in the fast charging state and in doing so, power may bypass the FETs 202.

At 512, the process 500 may transmit an indication to the wireless headphone indicating an acknowledgement that the case received the instruction to charge via the switching charger. For example, the case 100 may transmit an acknowledgment to the wireless headphone indicating that the case 100 will charge the wireless headphone via the switching charger.

Alternatively, if at 504 the process 500 determines that an indication to charge the wireless headphone via the switching charger was not received, the process 500 may follow the "NO" route and proceed to 514.

At 514, the process 500 may receive an indication to stop charging the wireless headphone. For example, upon the wireless headphone being charged via the linear charger and/or the switching charger or having a sufficient battery charge, the case 100 may receive an indication that the wireless headphone is fully charged and to stop charging (or transmitting power) to the wireless headphone.

At 516, the process 500 may configure the case to stop charging the wireless headphone. For example, in some instances, after the wireless headphone is charged via the linear charger and/or the switching charger, the case 100 may configure to stop charging. In some instances, configuring the case 100 to stop charging may include disabling the FETs 202 and charging via the switching charger.

As shown in FIG. 5, in some instances, the process 500, from 502, may proceed to 518, whereby the process 500 may determine that the wireless headphone is disconnected, or has disconnected, from the case 100. For example, the case 100 may determine or receive an indication that the wireless headphone has disconnected from the case 100. In such instances, the process 500 may proceed to 516 to configure the case 100 to stop charging the wireless headphone.

Although the process 500 is described with charging a wireless headphone, such as the first wireless headphone 102(1) or the second wireless headphone 102(2), it is to be understood that both wireless headphones 102 (i.e., the first wireless headphone 102(1) and the second wireless headphone 102(2)) may be charged simultaneously. For example, the case 100 may receive indications from both the first wireless headphone 102(1) and the second wireless headphone 102(1) to charge the battery 118 and the battery 120 to respective voltage thresholds, or via the linear charger or the switching charger, respectively. In other words, the case 100 may perform operations to recharge the first wireless headphone 102(1) and the second wireless headphone 102(2), and the case 100 may perform the process 500, or certain operations thereof, depending on the indications received from the first wireless headphone 102(1) and the second wireless headphone 102(2), respectively.

Figure 6A:
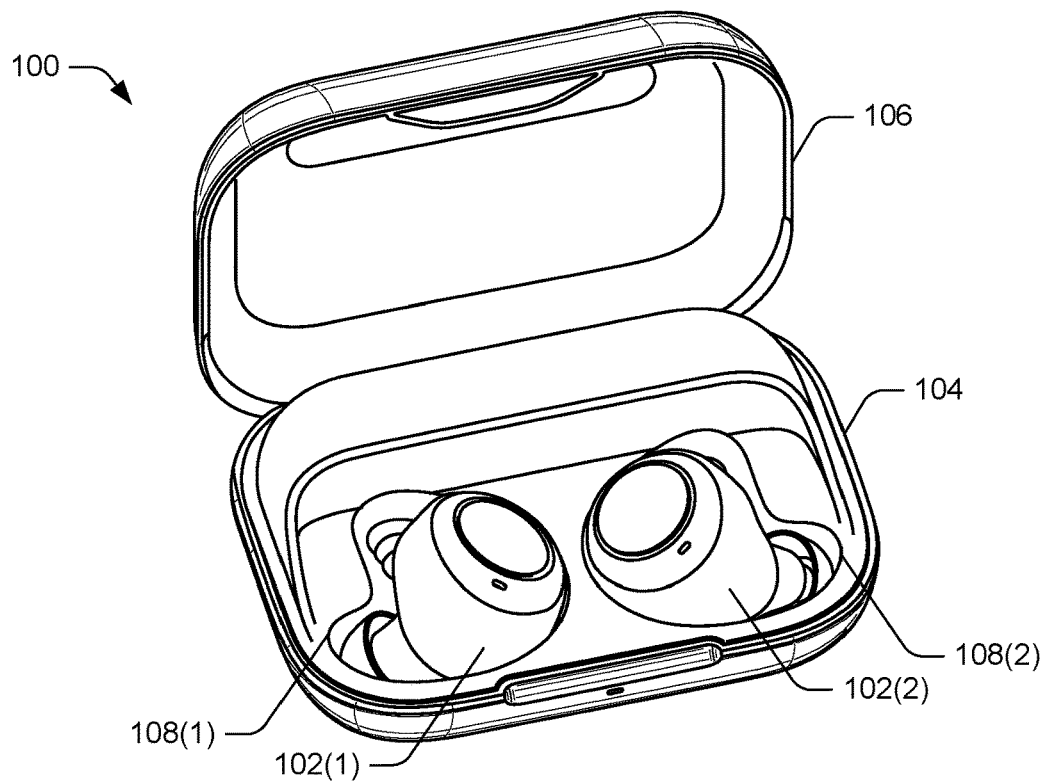
FIG. 6A illustrates the case of FIG. 1 in an open state, having the wireless headphones disposed therein, according to an embodiment of the present disclosure.
Figure 6B:
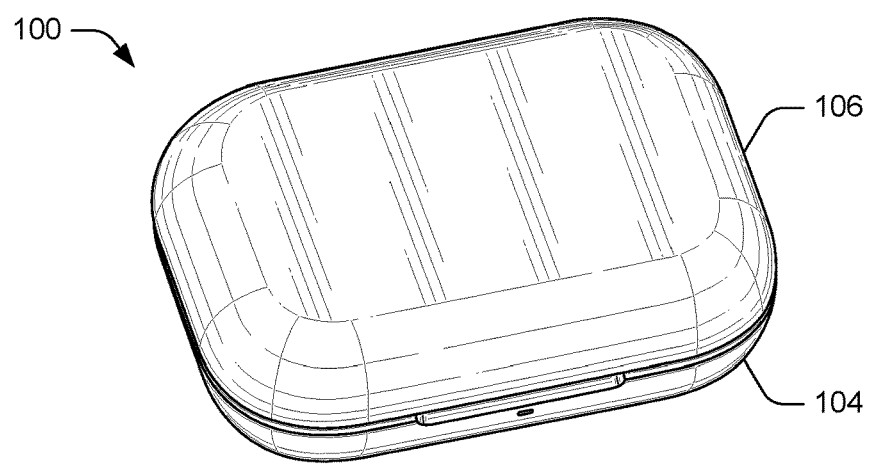
FIG. 6B illustrates the case of FIG. 1 in a closed state, according to an embodiment of the present disclosure.

FIGS. 6A and 6B illustrate the case 100. More particularly, FIG. 6A illustrates the case 100 in an open state, showing the wireless headphones 102 residing therein, while FIG. 6B illustrates the case 100 in a closed state. As discussed above, the case 100 may include the bottom 104 and the top 106 that pivotably couples to the bottom 104 for opening and closing the case 100.

In FIG. 6A, the first wireless headphone 102(1) is shown residing within the first receptacle 108(1) and the second wireless headphone 102(2) is shown residing within the second receptacle 108(2). When the first wireless headphone 102(1) resides within the first receptacle 108(1), the first contacts 110 may engage with the contacts 112 to enable charging of the battery 118 and/or communication between the first wireless headphone 102(1) and the case 100. Similarly, when the second wireless headphone 102(2) resides within the second receptacle 108(2), the second contacts 114 may engage with the contacts 116 to enable charging of the battery 120 and/or communication between the second wireless headphone 102(1) and the case 100.

In some instances, the case 100 may include indicators (e.g., lights, display, etc.) that indicates a charging status and/or a current battery life of the wireless headphones 102. For instance, the case 100 may include a light indicator that changes color, or progressively illuminates a series of lights, to indicate charging of the wireless headphones 102, a charging level of the electronic device(s), and/or an amount of time remaining until the wireless headphones 102 are fully charged.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A wireless earbud comprising:
   a battery;
   a first charging unit;
   one or more processors; and
   one or more non-transitory computer-readable media storing computer-executable instructions that, when executed by the one or more processors, cause the one or more processors to perform acts comprising:
   charging, via the first charging unit, the battery using a first voltage received from a second charging unit of a device separate from the wireless earbud,
   sending, to the second charging unit, a request associated with using a second voltage to charge the battery, the second voltage being greater than the first voltage,
   receiving, from the second charging unit, the second voltage, and
   ceasing charging of the battery via the first charging unit.

2. The wireless earbud of claim 1, the acts further comprising receiving an acknowledgment associated with the second charging unit receiving the request, wherein ceasing charging of the battery via the first charging unit is further based at least in part on receiving the acknowledgment.

3. The wireless earbud of claim 1, the acts further comprising:
   sending, to the second charging unit, a second request associated with using a third voltage, the third voltage being less than the second voltage; and
   charging, via the first charging unit, the battery using the third voltage received from the second charging unit.

4. The wireless earbud of claim 3, wherein:
   the battery is charged using the first voltage during a first period of time;
   the battery is charged using the second voltage during a second period of time that is after the first period of time, the second period of time being greater than the first period of time; and
   the battery is charged using the third voltage during a third period of time that is after the second period of time, the third period of time being less than the second period of time.

5. The wireless earbud of claim 1, the acts further comprising sending a second request to the second charging unit requesting to stop providing the second voltage.

6. The wireless earbud of claim 1, further comprising one or more field effect transistors (FETs), wherein the one or more FETs are enabled based at least in part on receiving the second voltage.

7. The wireless earbud of claim 1, the acts further comprising:
   determining a charge state of the battery;
   determining that the charge state satisfies a threshold;
   sending, to the second charging unit, a second request associated with using a third voltage, the third voltage being less than the second voltage; and
   charging, via the first charging unit, the battery using the third voltage received from the second charging unit.

8. A method, comprising:
   causing, via a first charging unit of a wireless headphone, a battery of the wireless headphone to be charged using a first voltage received from a second charging unit of a device,
   sending, to the second charging unit, a request associated with using a second voltage to charge the battery, the second voltage being greater than the first voltage,
   receiving, from the second charging unit, the second voltage, and
   ceasing charging of the battery via the first charging unit.

9. The method of claim 8, further comprising receiving an acknowledgment associated with the second charging unit receiving the request, wherein ceasing charging of the battery via the first charging unit is based at least in part on receiving the acknowledgment.

10. The method of claim 8, further comprising:
sending, to the second charging unit, a second request associated with using a third voltage to charge the battery, the third voltage being less than the second voltage; and
causing, via the first charging unit, the battery to be charged using the third voltage received from the second charging unit.

11. The method of claim 8, wherein:
the wireless headphone includes one or more first field effect transistors (FETs);
the second charging unit includes one or more second FETs;
during charging of the battery via the first voltage, the one or more first FETs and the one or more second FETs are disabled; and
during charging of the battery via the second voltage, the one or more first FETs and the one or more second FETs are enabled.

12. The method of claim 8, further comprising:
determining a first charge state of the battery; and
determining that the first charge state is less than a first threshold,
wherein causing, via the first charging unit, the battery to be charged using the first voltage is based at least in part on the first charge state being less than the first threshold.

13. The method of claim 12, further comprising:
determining a second charge state of the battery; and
determining that the second charge state is greater than the first threshold,
wherein sending the request is based at least in part on the second charge state being greater than the first threshold.

14. The method of claim 13, further comprising:
determining a third charge state of the battery;
determining that the third charge state is greater than a second threshold;
sending, to the second charging unit, a second request associated with using a third voltage to charge the battery, the third voltage being less than the second voltage; and
causing, via the first charging unit, the battery to be charged using the third voltage received from the second charging unit.

15. A system, comprising:
a first electronic device including:
a first battery,
a first charging unit,
one or more first processors, and
one or more first non-transitory computer-readable;
a second electronic device including:
a second battery,
a second charging unit,
one or more second processors, and
one or more second non-transitory computer-readable media; and
a third electronic device including a third charging unit, and
wherein the one or more first non-transitory computer-readable media store computer-executable instructions that, when executed by the one or more first processors, cause the one or more first processors to perform acts comprising:
causing, using the first charging unit, the first battery to be charged via a first voltage received from the third electronic device,
sending, to the third electronic device, a request associated with charging the first battery via a second voltage, the second voltage being greater than the first voltage,
receiving, from the third charging unit of the third electronic device, the second voltage, and
ceasing charging of the first battery via the first charging unit.

16. The system of claim 15, wherein ceasing charging of the first battery via the first charging unit is based at least in part on receiving the second voltage.

17. The system of claim 15, the acts further comprising:
sending, to the third electronic device, a second request associated with charging the first battery via a third voltage, the third voltage being less than the second voltage; and
causing, using the first charging unit, the first battery to be charged via the third voltage received from the third charging unit of the third electronic device.

18. The system of claim 15, the acts further comprising:
determining a charge state of the first battery;
determining that the charge state is less than a threshold; and
sending, to the third electronic device, a second request associated with receiving the first voltage.

19. The system of claim 15, the acts further comprising receiving an acknowledgment associated with the third electronic device receiving the request, wherein ceasing charging of the first battery via the first charging unit is based at least in part on receiving the acknowledgment.

20. The system of claim 15, wherein the one or more second non-transitory computer-readable media store computer-executable instructions that, when executed by the one or more second processors, cause the one or more second processors to perform acts comprising:
causing, using the second charging unit, the second battery to be charged via a third voltage received from the third electronic device,
sending, to the third electronic device, a second request associated with charging the second battery via a fourth voltage, the fourth voltage being greater than the third voltage,
receiving, from the third charging unit of the third electronic device, the fourth voltage, and
ceasing charging of the second battery via the second charging unit.

* * * * *